US009989013B2

(12) United States Patent
Sloman

(10) Patent No.: US 9,989,013 B2
(45) Date of Patent: Jun. 5, 2018

(54) ROCKET MOTORS AND THEIR USE

(71) Applicant: Roger Mark Sloman, Ashbourne (GB)

(72) Inventor: Roger Mark Sloman, Ashbourne (GB)

(73) Assignee: Advanced Reaction Motor Systems Limited, Derby (GB)

( * ) Notice: Subject to any disclaimer, the term of this patent is extended or adjusted under 35 U.S.C. 154(b) by 179 days.

(21) Appl. No.: 14/760,974

(22) PCT Filed: Jan. 15, 2014

(86) PCT No.: PCT/GB2014/050110
§ 371 (c)(1),
(2) Date: Jul. 14, 2015

(87) PCT Pub. No.: WO2014/111709
PCT Pub. Date: Jul. 24, 2014

(65) Prior Publication Data
US 2015/0361923 A1    Dec. 17, 2015

(30) Foreign Application Priority Data

Jan. 15, 2013 (GB) .................................. 1300720.8

(51) Int. Cl.
*F02K 9/34* (2006.01)
*F02K 9/12* (2006.01)
(Continued)

(52) U.S. Cl.
CPC ................ *F02K 9/346* (2013.01); *F02K 1/00* (2013.01); *F02K 9/12* (2013.01); *F02K 9/16* (2013.01);
(Continued)

(58) Field of Classification Search
CPC ...... F02K 9/10; F02K 9/12; F02K 9/28; F02K 9/30; F02K 9/32; F02K 9/34; F02K 9/346; F02K 9/97
See application file for complete search history.

(56) References Cited

U.S. PATENT DOCUMENTS 2,569,996 A    10/1951 Kollsman
2,995,091 A    8/1961 Haymes et al.
(Continued)

FOREIGN PATENT DOCUMENTS

CN    1231248    10/1999
EP    0646717    4/1995
(Continued)

OTHER PUBLICATIONS

GB Search Report dated Nov. 22, 2016 for corresponding GB Application No. 1400672.0, 3 pages.
(Continued)

*Primary Examiner* — Steven Sutherland
(74) *Attorney, Agent, or Firm* — Lee & Hayes, PLLC

(57) ABSTRACT

Apparatus, methods and computer programs are provided. In one example, an apparatus is a rocket motor, comprising: a casing having a length dimension, a width dimension and a depth dimension, wherein the length dimension is greater than the width dimension and greater than the depth dimension; and propellant, located inside the casing, arranged to generate a force in a direction that is substantially perpendicular to the length dimension of the casing.

27 Claims, 27 Drawing Sheets

(51) Int. Cl.
  *F02K 9/28*   (2006.01)
  *F02K 1/00*   (2006.01)
  *F02K 9/97*   (2006.01)
  *F41H 7/04*   (2006.01)
  *F02K 9/16*   (2006.01)

(52) U.S. Cl.
  CPC ............. *F02K 9/28* (2013.01); *F02K 9/97* (2013.01); *F41H 7/042* (2013.01); *F05D 2250/12* (2013.01)

(56) References Cited

U.S. PATENT DOCUMENTS

| | | | |
|---|---|---|---|
| 3,442,084 A * | 5/1969 | Cramm | F02K 9/28 60/250 |
| 3,946,557 A * | 3/1976 | Macbeth | F02K 9/346 102/381 |
| 4,681,261 A * | 7/1987 | Wetzler | F02K 9/97 239/265.11 |
| 5,473,817 A | 12/1995 | Schnoor et al. | |
| 6,352,030 B1 * | 3/2002 | Doll | C06D 5/06 102/287 |
| 6,487,844 B1 * | 12/2002 | Lohn | F02K 9/88 60/200.1 |
| 6,702,300 B1 | 3/2004 | Steinetz et al. | |
| 6,938,924 B2 * | 9/2005 | Feldman | B60R 99/00 180/282 |
| 7,194,852 B1 | 3/2007 | Krishnan | |
| 7,874,513 B1 | 1/2011 | Smith | |
| 8,739,676 B2 | 6/2014 | Ames | |
| 2003/0127559 A1 | 7/2003 | Walmsley | |
| 2006/0006289 A1 | 1/2006 | Janeke | |
| 2009/0235640 A1 | 9/2009 | Cavalleri et al. | |
| 2013/0014491 A1 | 1/2013 | Suzuki et al. | |
| 2014/0096672 A1 | 4/2014 | Ames | |
| 2014/0214281 A1 | 7/2014 | Welker et al. | |
| 2014/0224110 A1 | 8/2014 | Sagebiel et al. | |

FOREIGN PATENT DOCUMENTS

| | | |
|---|---|---|
| EP | 1621753 | 2/2006 |
| GB | 985944 | 3/1965 |
| JP | 2006152917 | 6/2006 |
| WO | WO2012/052768 | 4/2012 |
| WO | WO2012/085138 | 6/2012 |

OTHER PUBLICATIONS

Choudhury, Sanjiban et al., "Autonomous Emergency Landing of a Helicopter: Motion Planning with Hard Time-Constraints", Presented at the AHS 69th Annual Forum, Phoenix, Arizona, May 21-23, 2013. American Helicopter Society International, Inc., 14 pages.

"Controlled Flight into Terrain", retreived at <<http://www.skybrary.aero/index.php/Category:Controlled_Flight_Into_Terrain>>, 4 pages The GB Search Report dated Aug. 12, 2014 for GB application No. 1400672.0, 5 pages.

The PCT Search Report dated Jun. 20, 2014 for PCT application No. PCT/GB2014/050110, 6 pages.

* cited by examiner

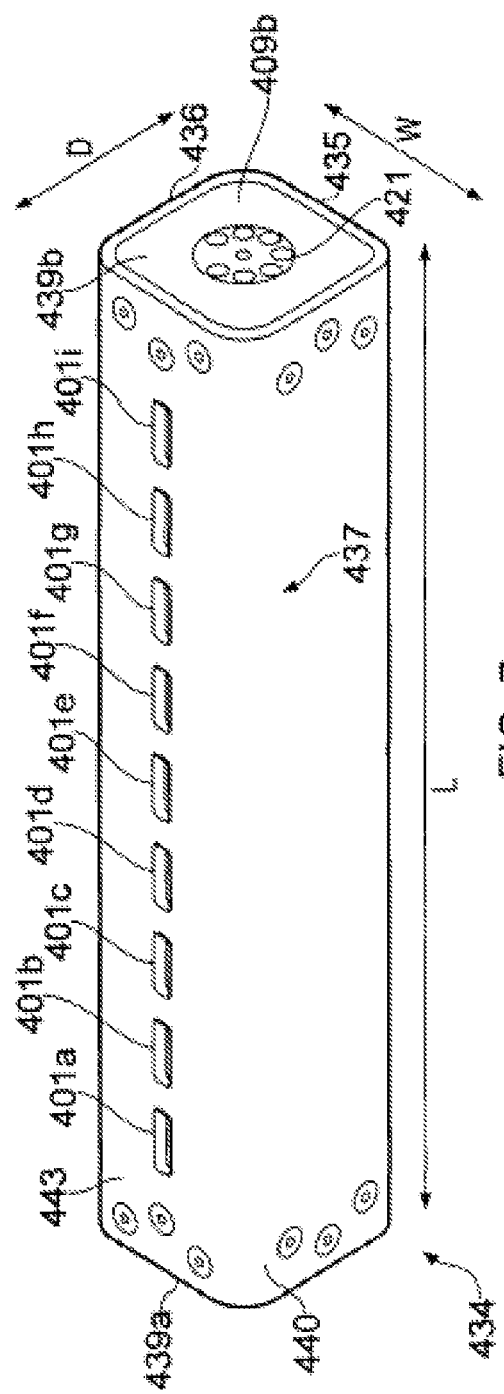
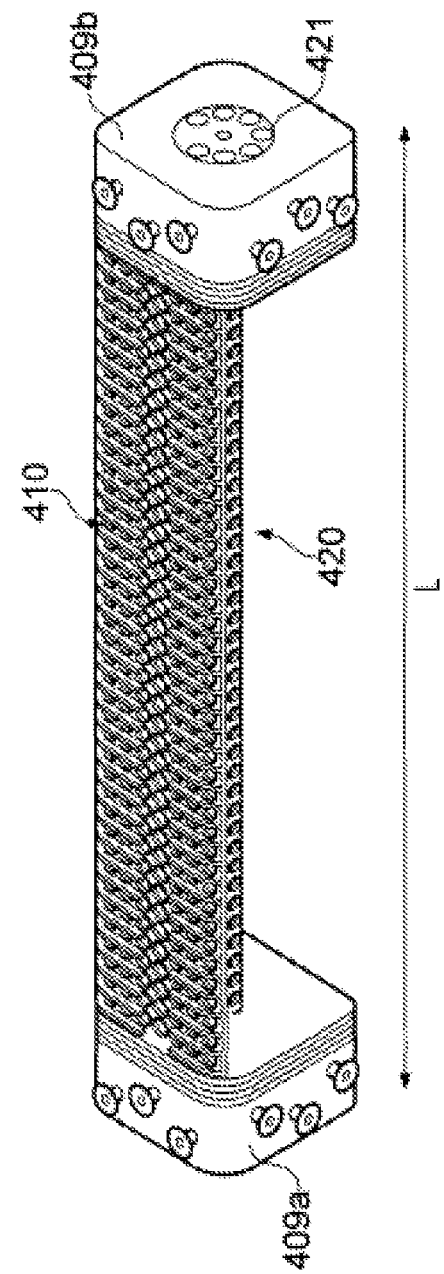
FIG. 7
FIG. 8

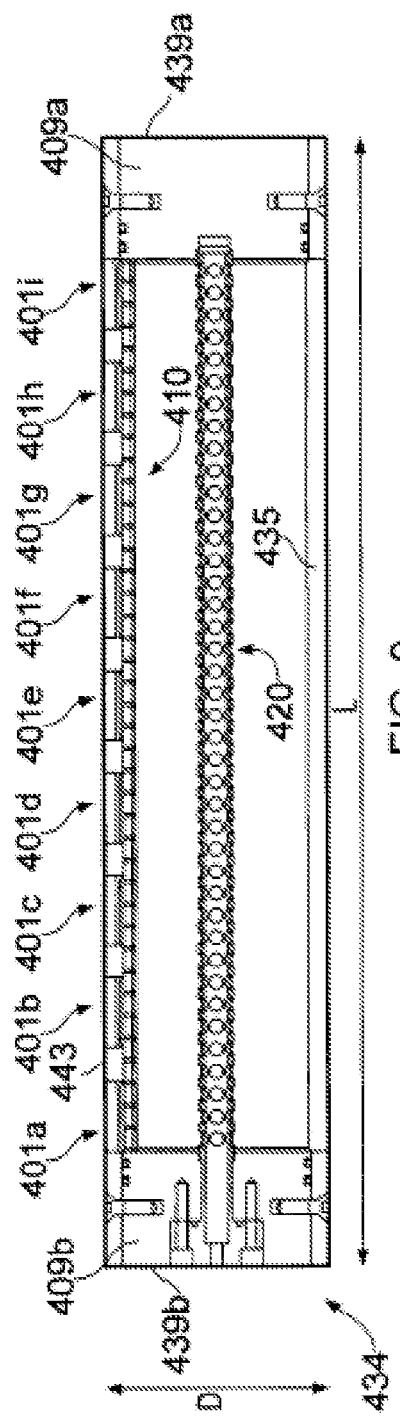
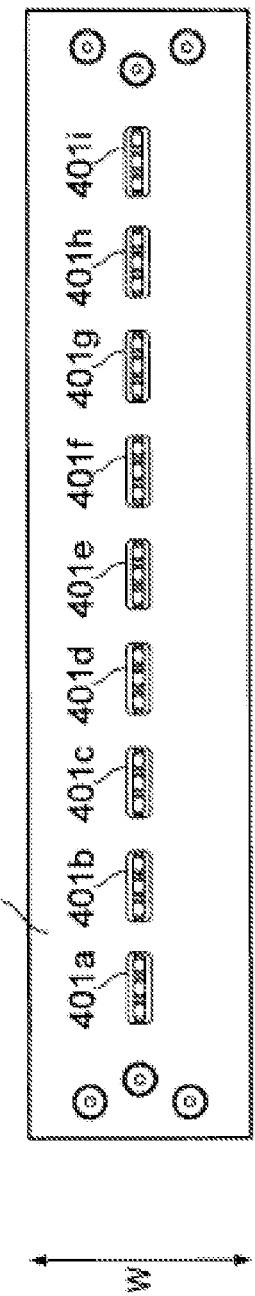
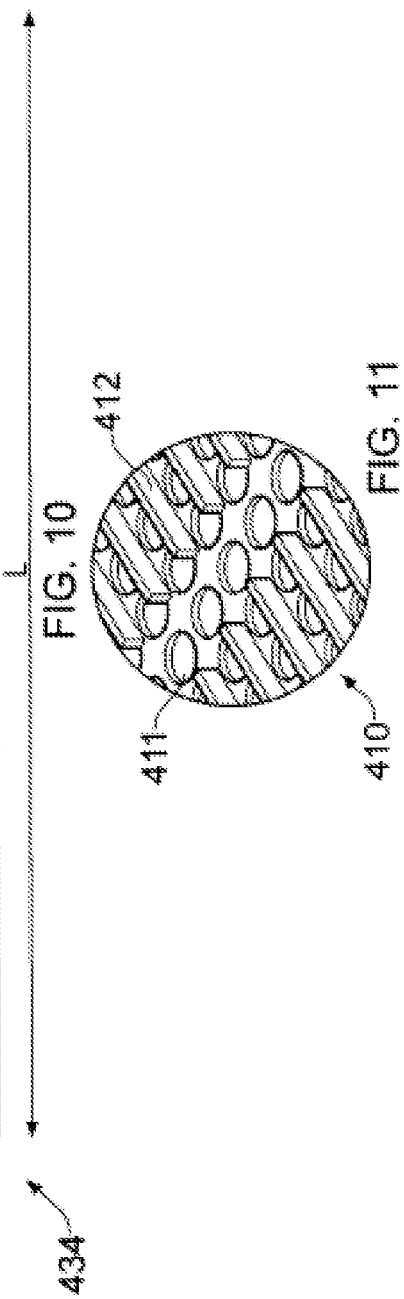

34/434/534/634/734

34/434/534/634/734

ROCKET MOTORS AND THEIR USE

TECHNOLOGICAL FIELD

Embodiments of the present invention relate to rocket motors and their use.

BACKGROUND

A rocket motor/engine comprises propellant which, when ignited, causes the rocket motor to eject gas. Ejection of the gas generates thrust.

BRIEF SUMMARY

According to some, but not necessarily all, embodiments of the invention there is provided a rocket motor, comprising: a casing having a length dimension, a width dimension and a depth dimension, wherein the length dimension is greater than the width dimension and greater than the depth dimension; and propellant, located inside the casing, arranged to generate a force in a direction that is substantially perpendicular to the length dimension of the casing.

The propellant may be arranged to cause ejection of gas from the casing in a direction that is substantially aligned with the depth dimension of the casing. The propellant may be arranged to cause ejection of gas from the casing in a direction that is substantially perpendicular to the length dimension of the casing. The propellant may be in the form of pellets.

The length dimension is orthogonal to the width dimension, the length dimension is orthogonal to the depth dimension, and the width dimension is orthogonal to the depth dimension. At least part of the casing may be extruded.

The casing may comprise a plurality of exit gas apertures. At least some of the gas exit apertures may diverge in the direction of movement of gas ejected from the casing in operation.

The casing may define one or more rocket nozzles. The casing may be arranged to store non-gaseous matter. The propellant may be arranged to generate a groundwards force by ejecting the non-gaseous matter from the casing. The non-gaseous matter may be at least partially positioned in the rocket nozzle.

The propellant may comprise a first propellant material and a second propellant material. The first propellant material may be arranged to eject the non-gaseous matter from the casing to generate a first groundwards force. The second propellant material may be arranged, following ejection of the non-gaseous matter from the casing, to cause ejection of gas from the casing to generate a second groundwards force.

At least one of the one or more rocket nozzles may comprise a converging portion and a diverging portion. The first propellant material may be at least partially positioned in the diverging portion of the at least one rocket nozzle. The second propellant material may be at least partially positioned in the converging portion of the at least one rocket nozzle.

The first propellant material may be a high explosive. The second propellant material may be a non-detonating propellant.

According to some, but not necessarily all, embodiments of the invention there is provided a rocket motor, comprising: a rocket nozzle; and propellant, at least a portion of which is positioned in the rocket nozzle.

The rocket motor may further comprise non-gaseous matter arranged for ejection from the rocket motor.

The propellant may comprise a first propellant material and a second propellant material.

The first propellant material may be arranged to eject the non-gaseous matter from the rocket motor to generate a first groundwards force. The second propellant material may be arranged, following ejection of the non-gaseous matter from the rocket motor, to cause ejection of gas from the casing to generate a second groundwards force.

The rocket nozzle may comprise a converging portion and a diverging portion. The first propellant material may be at least partially positioned in the diverging portion of the rocket nozzle. The second propellant material may be at least partially positioned in the converging portion of the rocket nozzle.

The first propellant material may be a high explosive and the second propellant material may be a non-detonating propellant.

According to some, but not necessarily all, embodiments of the invention there is provided a rocket motor, comprising: a casing having a length dimension, a width dimension and a depth dimension, wherein the length dimension is greater than the width dimension and greater than the depth dimension; and propellant, located inside the casing, arranged to generate a force by ejecting matter from the casing in a direction that is substantially perpendicular to the length dimension of the casing.

According to some, but not necessarily all, embodiments of the invention there is provided a rocket motor, comprising: non-gaseous matter arranged for ejection from the rocket motor; a first propellant material arranged to eject the non-gaseous matter from the rocket motor to generate a first groundwards force; and a second propellant material arranged, following ejection of the non-gaseous matter from the rocket motor, to cause ejection of gas from the rocket motor to generate a second groundwards force.

The first propellant material may be located above the second propellant material. The second propellant material may be arranged to be ignited at substantially the same time as the first propellant material. The second propellant material may be arranged to be ignited by the first propellant material.

The rocket motor may further comprise a casing containing the non-gaseous matter, the first propellant material and the second propellant material. The casing may comprise a plurality of exit gas apertures via which gas is ejected from the rocket motor by the second propellant. At least some of the gas exit apertures may diverge in the direction of movement of gas ejected from the rocket motor.

The first propellant material may be a high explosive and the second propellant material may be a non-detonating propellant. The rocket motor may further comprise a rocket nozzle having a converging portion and a diverging portion. The first propellant material may be at least partially positioned in the diverging portion of the rocket nozzle. The second propellant material may be at least partially positioned in the converging portion of the rocket nozzle. The first propellant material may be a high explosive and the second propellant material may be a non-detonating propellant.

According to some, but not necessarily all, embodiments of the invention there is provided a method, comprising: responding to detection of an explosion local to a vehicle by causing a groundwards force to be applied to a belly plate of the vehicle, without providing an opposite force that urges the vehicle away from ground.

The groundwards force may be applied by igniting propellant. The groundwards force may be applied by one or more rocket motors.

The one or more rocket motors may apply the groundwards force to the belly plate of the vehicle without exhaust gases from the one or more rocket motors providing an opposite force that urges the vehicle away from ground.

The vehicle may comprise a body defining an internal enclosure for housing occupants of the vehicle. The groundwards force may be applied to the belly plate of the vehicle without providing an opposite force that urges the body of the vehicle away from ground.

The belly plate may be partially detached from the vehicle and may remain tethered to the body of the vehicle.

The groundwards force may be applied by igniting propellant positioned laterally along one or more sides of the vehicle.

According to some, but not necessarily all, embodiments of the invention there is provided a computer program comprising computer program instructions that, when performed by at least one processor, cause the method as described above to be performed. A non-transitory computer readable medium may store the computer program.

According to some, but not necessarily all, embodiments of the invention there is provided an apparatus comprising means for performing the method as described above.

According to some, but not necessarily all, embodiments of the invention there is provided an apparatus, comprising: a belly plate; and control circuitry configured to respond to detection of an explosion local to a vehicle by causing a groundwards force to be applied to at least partially detach the belly plate from the vehicle, without providing an opposite force that urges at least part of the vehicle away from ground.

According to some, but not necessarily all, embodiments of the invention there is provided an apparatus, comprising: a belly plate; and at least one rocket motor configured to respond to detection of an explosion local to a vehicle by applying a groundwards force to at least partially detach the belly plate from the vehicle, without providing an opposite force that urges at least part of the vehicle away from ground.

According to some, but not necessarily all, embodiments of the invention there is provided a method, comprising: applying an upwards force to a descending aircraft, operated by at least one pilot, using at least one rocket motor located on an underside of the aircraft.

The upwards force may be applied in response to detection of a potential collision. The potential collision may be potential controlled or uncontrolled flight into terrain or water.

The application of the upwards force may alter the pitch of the aircraft. The application of the upwards force may reduce the rate of descent of the aircraft or may cause the aircraft to ascend.

According to some, but not necessarily all, embodiments of the invention there is provided an aircraft, operable by at least one pilot present in the aircraft, comprising: at least one rocket motor, located on an underside of the aircraft; and control circuitry configured to cause the at least one rocket motor to apply an upwards force to the aircraft when the aircraft is descending.

The control circuitry may be configured to cause the at least one rocket motor to apply the upwards force in response to detection of a potential collision. The potential collision may be potential controlled or uncontrolled flight into terrain or water.

The at least one rocket motor may be arranged on the aircraft such that application of the upwards force alters the pitch of the aircraft. The application of the upwards force may reduce the rate of descent of the aircraft or may cause the aircraft to ascend.

BRIEF DESCRIPTION

For a better understanding of various examples of embodiments of the present invention reference will now be made by way of example only to the accompanying drawings in which:

FIG. 7 illustrates a perspective view of a fifth example of a linear rocket motor;

FIG. 8 illustrates a perspective view of some component parts of the fifth example of a linear rocket motor;

FIG. 9 illustrates a cross sectional of the fifth example of a linear rocket motor;

FIG. 10 illustrates a plan view of the fifth example of a linear rocket motor;

FIG. 11 illustrates a filter from the fifth example of a linear rocket motor;

DETAILED DESCRIPTION

Embodiments of the invention relate to rocket motors and their use. In some implementations, one or more rocket motors are used to apply a groundwards force to a vehicle to mitigate or prevent upwards acceleration of the vehicle following an explosion. In other implementations, one or more rocket motors are used to apply an upwards force to an aircraft to prevent or reduce the severity of a collision, for example, between the aircraft and ground.

The figures illustrate a rocket motor 34/134/234/334/434/534/634/734/834/934, comprising: a casing having a length dimension L, a width dimension W and a depth dimension D, wherein the length dimension L is greater than the width dimension W and greater than the depth dimension D; and propellant, located inside the casing, arranged to generate a force in a direction that is substantially perpendicular to the length dimension L of the casing.

The figures also illustrate an apparatus 10, comprising: a belly plate 31/131; and control circuitry 12 configured to respond to detection of an explosion local to a vehicle 2/202/302 by causing a groundwards force to be applied to at least partially detach the belly plate 31/131 from the vehicle 2/202/302 without providing an opposite force that urges at least part of the vehicle 2 away from ground 5.

The figures further illustrate an aircraft 1100/1200/1300, operable by at least one pilot present in the aircraft 1100/1200/1300, comprising: at least one rocket motor 34/134/234/334/434/534/634/734/834/934, located on an underside of the aircraft 1100/1200/1300; and control circuitry configured to cause the at least one rocket motor 34/134/234/334/434/534/634/734/834/934 to apply an upwards force to the aircraft 1100/1200/1300 when the aircraft 1100/1200/1300 is descending.

I. Rocket Motors

Figure 1:
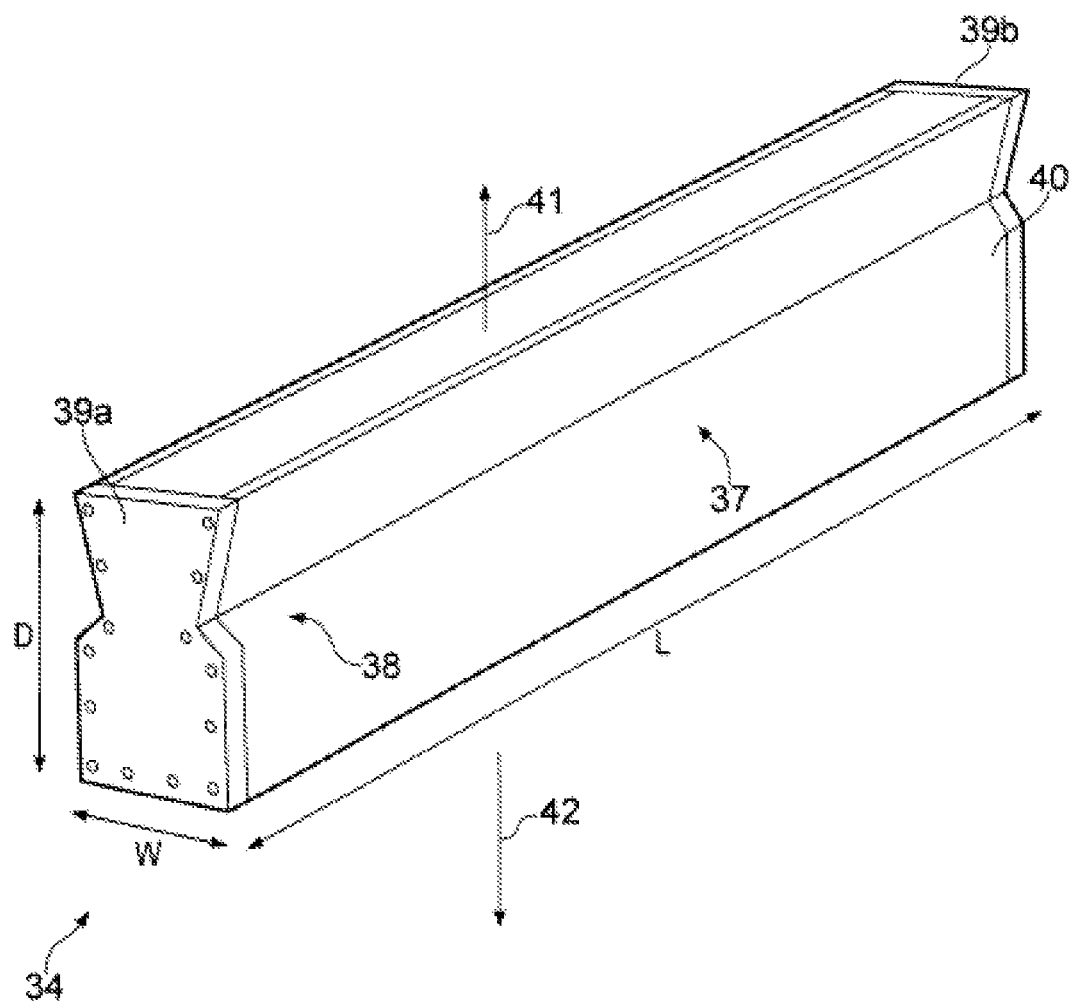
FIG. 1 illustrates a perspective view of a first example of a linear rocket motor.
Figure 2:
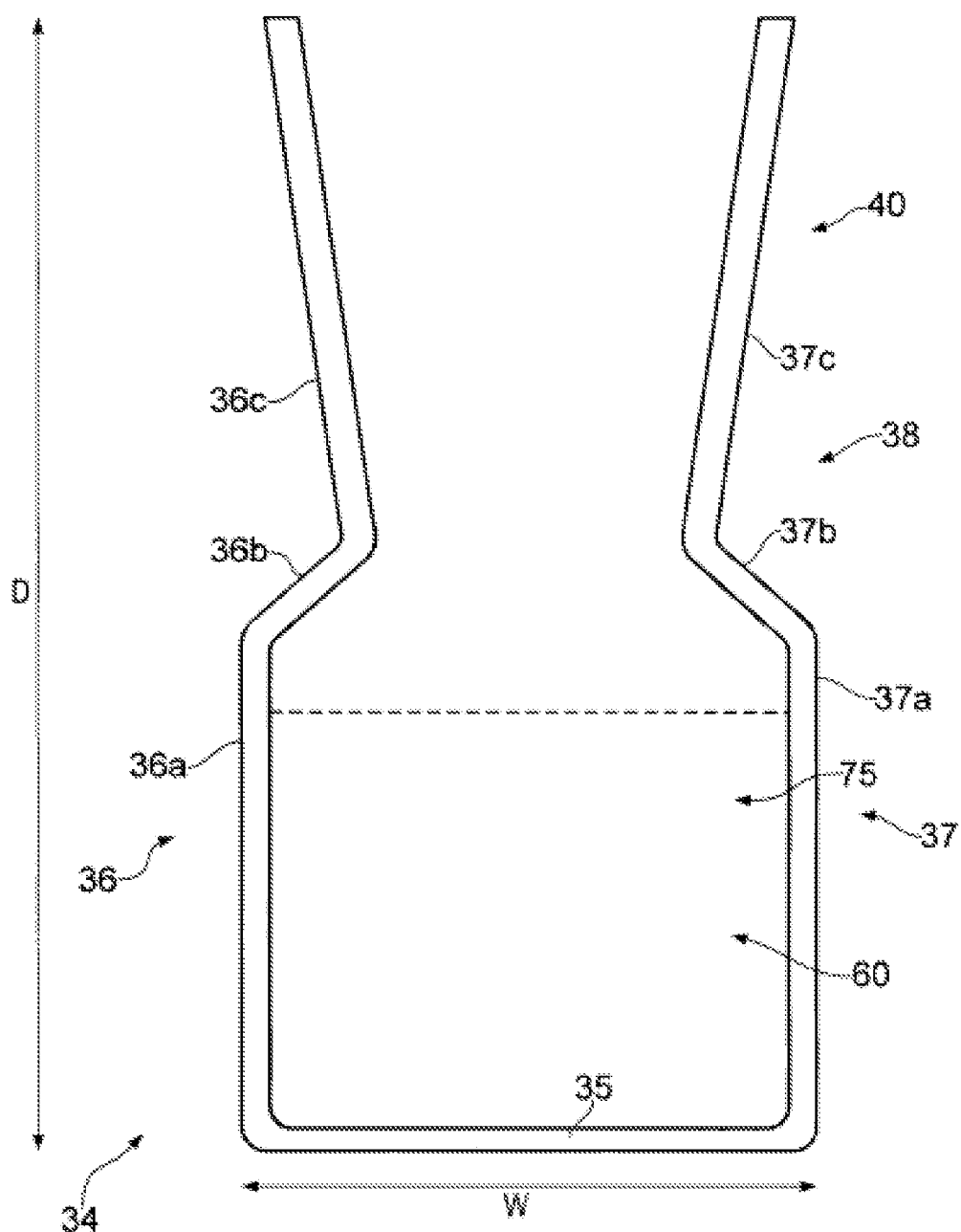
FIG. 2 illustrates a cross section of the first example of the linear rocket motor.

FIG. 1 illustrates a perspective view of a rocket motor/engine 34. FIG. 2 illustrates a cross sectional view of the rocket motor 34.

The rocket motor 34 includes a casing 40 having a length dimension L, a width dimension W and a depth dimension D.

The rocket motor 34 may be elongate in shape in that the length dimension L is greater than the width dimension W and the depth dimension D. For this reason, the rocket motor is hereinafter referred to as a "linear rocket motor".

In some examples, the length dimension L may be at least 1.25 times as great the width dimension W and/or at least 1.25 times as great as the depth dimension D. In other examples, the length dimension L may be at least twice as great as the width dimension W and/or at least twice as great as the depth dimension D. In some further examples, the length dimension L may be at least five times as great as the width dimension W and/or at least five times as great as the depth dimension D. In some implementations, the length dimension L is in the region of 125 millimeters to 100 meters, the width dimension W is in the region of 100 to 300 millimeters and the depth dimension D is in the region of 100 to 500 millimeters.

The length dimension L is orthogonal to the width dimension W and the depth dimension D. The width dimension W is orthogonal to the depth dimension D.

The casing 40 of the linear rocket motor 34 includes a base 35, a front wall 39a, two side walls 36, 37 and a rear wall 39b. The casing 40 might be made from aluminium or one or more other metals. The base 35 and the two side walls 36, 37 may be integrally formed. For example, since the cross-section of the base 35 and the two side walls 36, 37 is same across substantially the whole of the length dimension L, the base 35 and the two side walls 36, 37 can be formed as a single extruded part using an extrusion process. Thus, in this regard, at least part of the casing 40 may be formed by an extrusion process.

Figure 3:
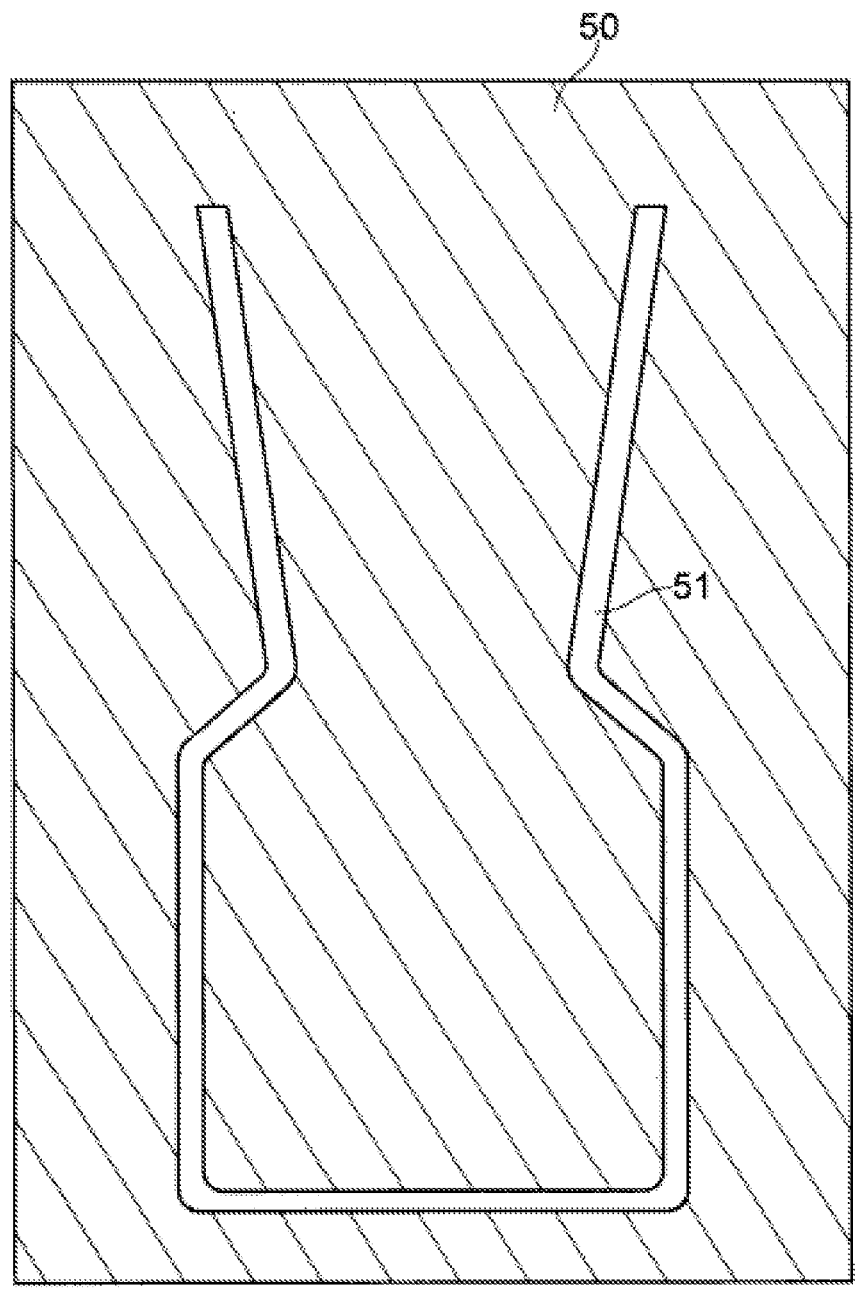
FIG. 3 illustrates a die for forming at least part of the linear rocket motor.

FIG. 3 illustrates a die 50 with an aperture 51 suitable for forming the base 35 and the two side walls 36, 37 of the casing 40. Once the base 35 and the two side walls 36, 37 have been formed, the front wall 39a and the rear wall 39b may be attached to the extruded part using one or more fasteners.

The base 35, a portion 36a, 37a of the side walls 36, 37, the front wall 39a and the rear wall 39b form a chamber 75 in which propellant may be stored. The propellant 60 may, for example, be solid propellant. The propellant may be manufactured using an extrusion process. In some examples, the propellant is a single item. It may have a honeycomb structure. Alternatively, the propellant may take the form of one or more fins. Alternatively, the propellant may take the form of multiple pellets. The pellets may or may not have perforations. The pellets may have a honeycomb structure.

It can be seen in FIG. 2 that each of side walls 36, 37 includes a converging portion 36b, 37b and a diverging portion 36c, 37c. The converging portions 36b, 37b and the diverging portions 36c, 37c of the casing 40 define a rocket nozzle 38. In some implementations insulating and erosion-resistant liners may be positioned inside the casing 40 at the rocket nozzle 38.

In the illustrated example, the rocket motor 34 has a substantially rectangular base 35. In other examples, this need not necessarily be the case.

In use, ignition of the propellant 60 located inside the casing 40 causes gas to be ejected from the casing 40 via the rocket nozzle 38. The direction in which gas is ejected from the casing 40 is shown by the arrow labelled with the reference numeral 41 in FIG. 1. It is substantially perpendicular to the length dimension L and substantially aligned with the depth dimension D.

Ejection of the gas from the casing 40 causes a reactionary force to be applied in the direction shown by the arrow labelled with the reference numeral 42 in FIG. 1. The vector direction of the reactionary force is also substantially perpendicular to the length dimension L and substantially aligned with the depth dimension D, but is opposite to the direction in which gas is ejected from the casing 40.

Use of propellant pellets in the rocket motor 34 might be preferred as it enables a high surface area of propellant to be provided along with a high loading density per unit volume of the chamber 75.

Erosive burning is a process in which gas flowing in a chamber of a rocket motor leads to an increased burning rate for a solid propellant. The solid propellant may, for example, break up during erosive burning, increasing the surface area of propellant within the chamber of the rocket motor. The increased burn rate caused by erosive burning leads to an increase in pressure within the chamber, which can cause the rocket motor to explode.

Advantageously, the linear rocket motor 34 illustrated in FIGS. 1 and 2 is not particularly sensitive to erosive burning because the linear rocket motor 34 is shallow in the direction in which gas flows inside the chamber 75 (that direction is aligned with the depth dimension D and indicated by the arrow labelled with the reference numeral 41 in FIG. 1).

The rocket motor 34 illustrated in FIGS. 1 and 2 advantageously provides a relatively short burn time (and hence high average thrust) and high total impulse from a compact total volume.

Figure 4:
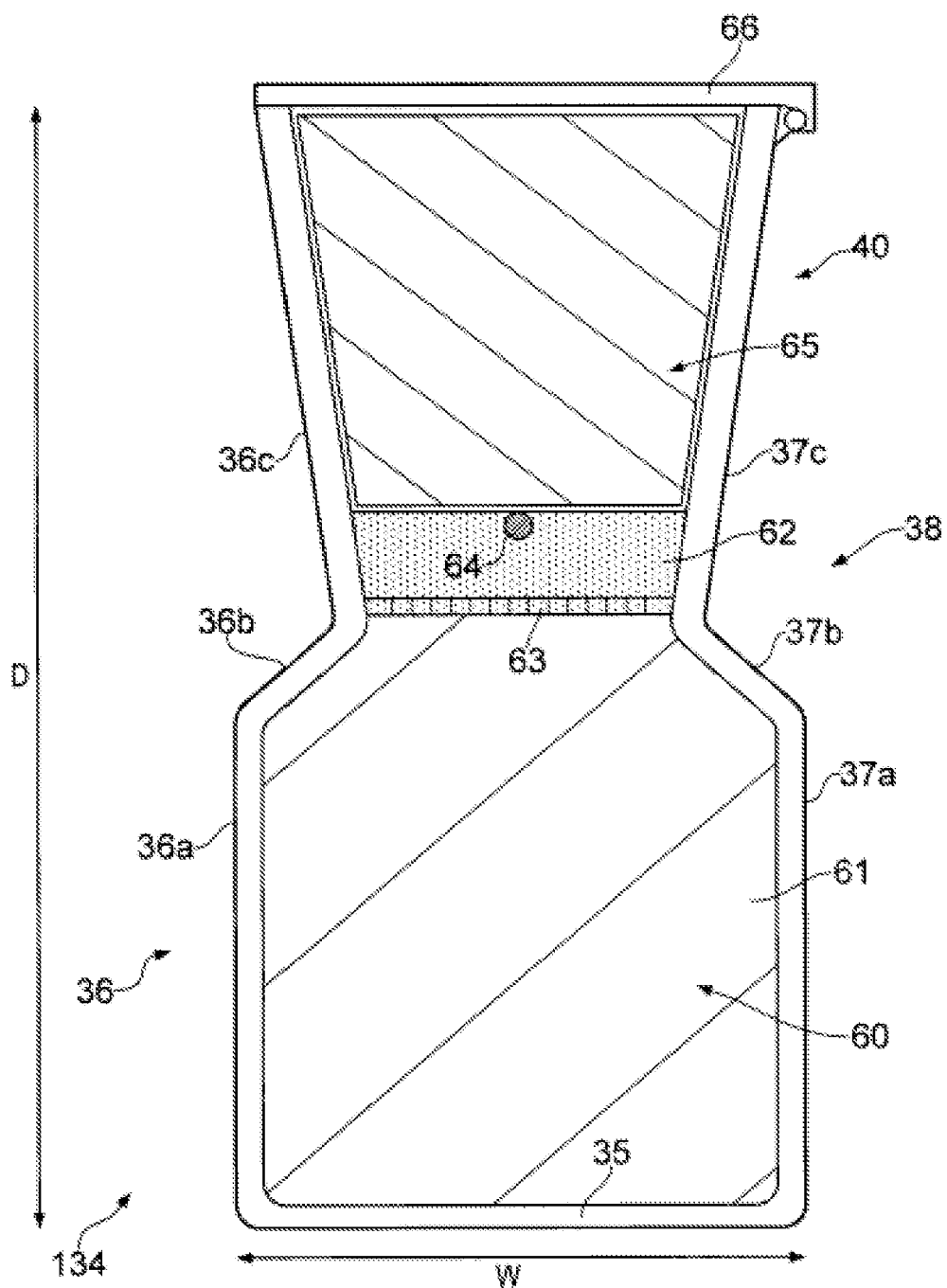
FIG. 4 illustrates a second example of a linear rocket motor.

FIG. 4 illustrates a second example 134 of a linear rocket motor. In this example, the casing 40 has the same structure as the casing 40 described above in relation to the first example 34 of a linear rocket motor.

In this implementation, the rocket motor 134 comprises non-gaseous matter 65, which is positioned in the diverging portion of the rocket nozzle 38. The non-gaseous matter 65 may be/comprise a solid and/or a liquid. For instance, the non-gaseous matter might be lead shot that is lightly bonded together with resin.

In this example, the propellant 60 includes a first propellant material 62 and a second propellant material 61. At least a portion of the propellant 60 is positioned in the rocket nozzle 38. In this particular example, the first propellant material 62 is at least partially positioned in the diverging portion of the rocket nozzle 38 and the second propellant material 61 is at least partially positioned in the converging portion of the rocket nozzle 38.

The first propellant material 62 may be a high explosive and the second propellant material 61 may be a non-detonating propellant. The first propellant material 62 is arranged to eject the non-gaseous matter 65 from the rocket motor 134 in order to generate a first force. The vector direction of the generated first force is the same as that indicated by the arrow labelled with the reference numeral 42 in FIG. 1.

The second propellant material 61 is arranged, following ejection of the non-gaseous matter from the rocket motor 134, to cause ejection of gas from the rocket motor 134 to generate a second force. The vector direction of the generated second force is the same as that indicated with the arrow labelled by the reference numeral 42 in FIG. 1.

The rocket motor 134 illustrated in FIG. 4 includes a protective hinged cover 66 to prevent the inadvertent activation of the rocket motor 134 (for example, in response to enemy fire).

The rocket motor 134 comprises a first igniter 64 that is arranged to ignite the first propellant material 62 which, in turn, causes the non-gaseous matter 65 to be ejected (effectively as a projectile). The first propellant material 62 causes the second igniter 63 to ignite, which in turn ignites the second propellant material 61 such that gas is ejected from the rocket motor 134 after the ejection of the non-gaseous matter.

Figure 5:
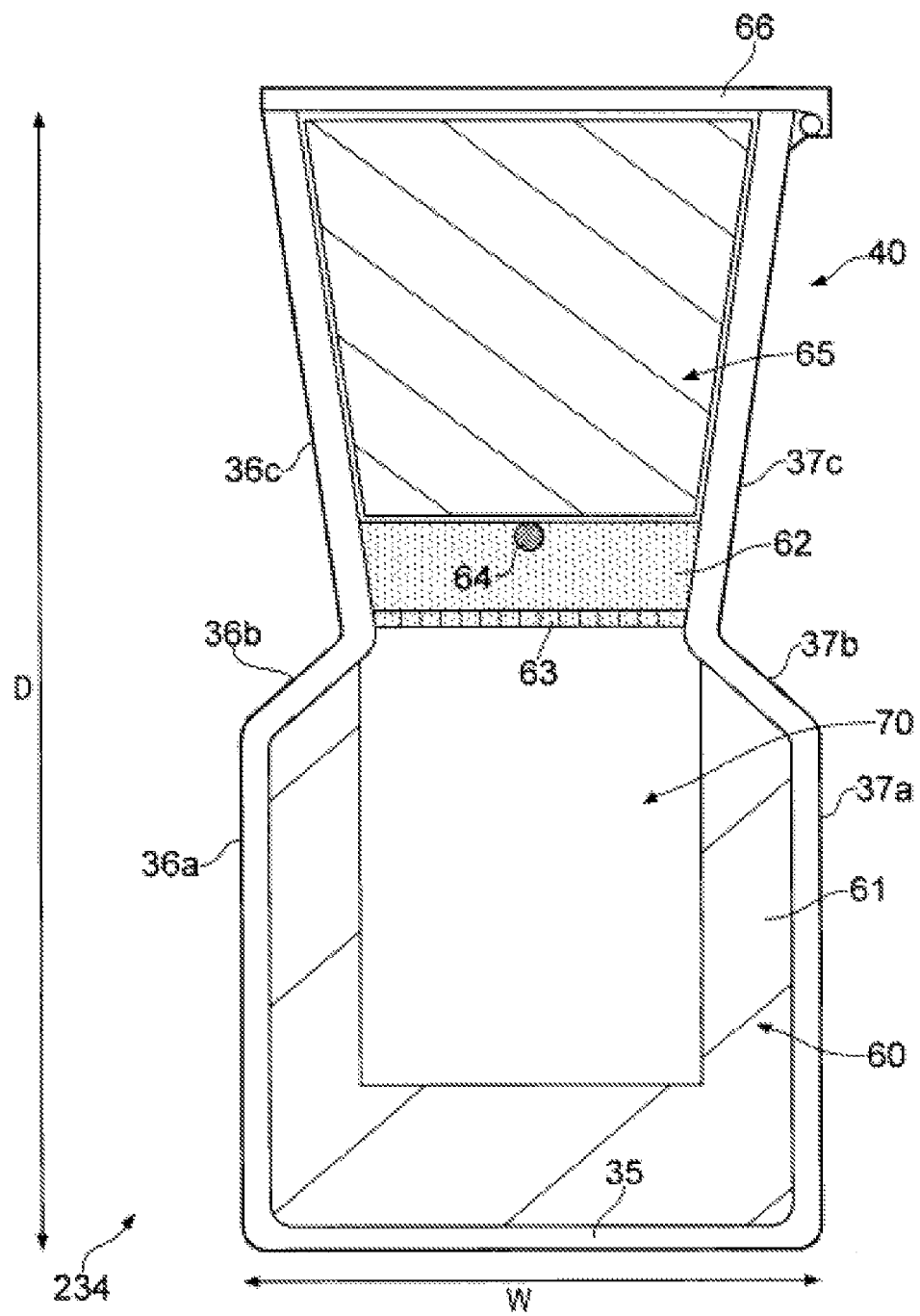
FIG. 5 illustrates a third example of a linear rocket motor.

FIG. 5 illustrates a third example 234 of a linear rocket motor that differs from the second example 134 illustrated in FIG. 4 in that the second propellant material 61 merely lines the inner walls of the lower part of the casing 40, leaving a gap 70 in the second propellant material 61. Advantageously, the rocket motor 234 illustrated in FIG. 5 may take less time to reach a particular magnitude of force than the second example 134 illustrated in FIG. 4.

Figure 6:
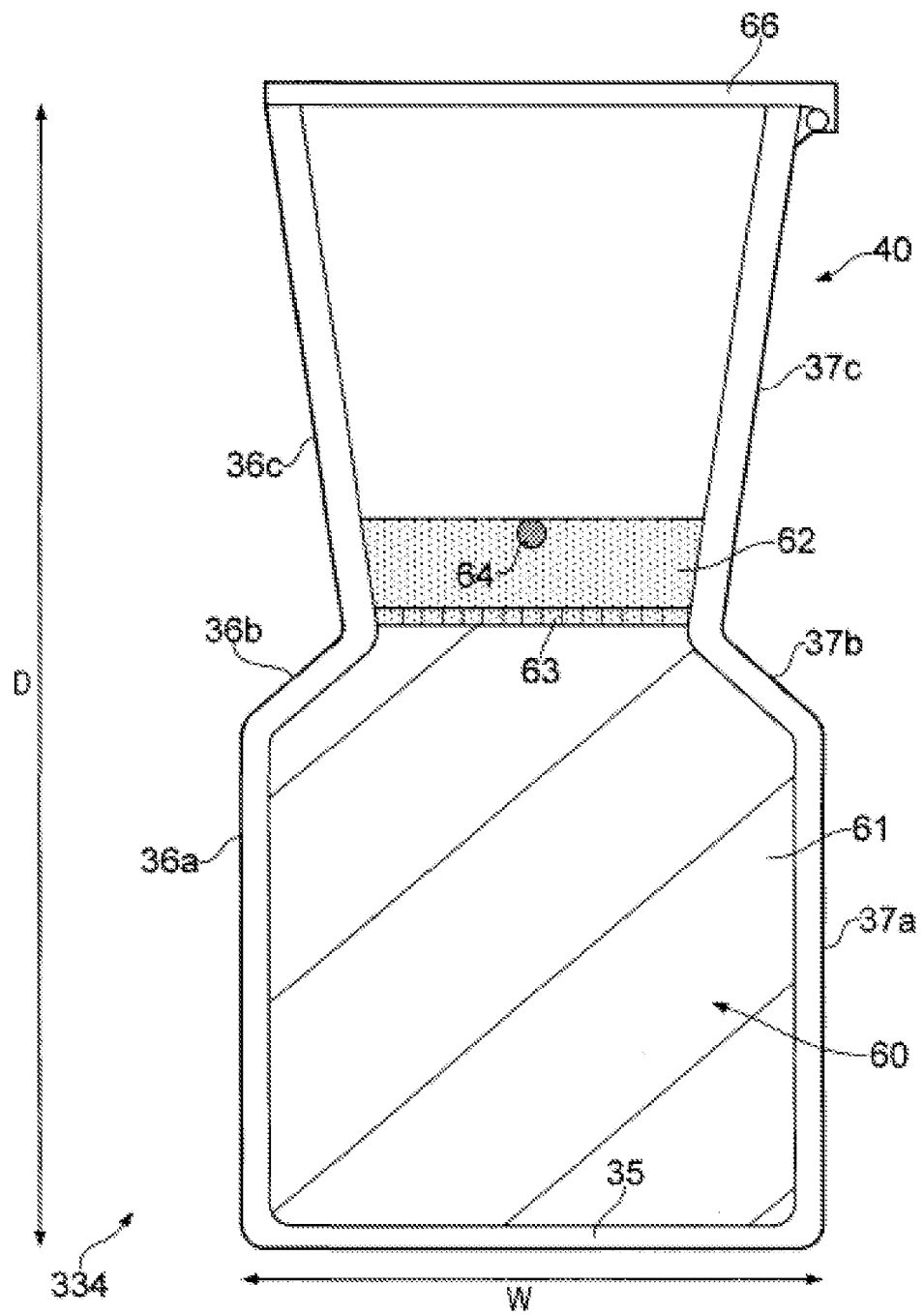
FIG. 6 illustrates a fourth example of a linear rocket motor.

FIG. 6 illustrates a fourth example 334 of a linear rocket motor in which the non-gaseous matter 65 is not present. In this example, the first propellant material 62 generates a force without ejecting non-gaseous matter 65.

FIG. 7 illustrates a perspective view of a fifth example 434 of a linear rocket motor. The fifth example 434 of the linear rocket motor is similar to the first, second, third and fourth examples 34, 134, 234, 334 in that it has a length dimension L which is much greater than its width dimension W and its depth dimension D, and in that its length dimension L, its width dimension W and its depth dimension D are substantially orthogonal to one another.

As explained above in relation to the first, second and third examples 34, 134, 234 of the linear rocket motor, in some examples, the length dimension L may be at least 1.25 times as great the width dimension W and/or at least 1.25 times as great as the depth dimension D. In other examples, the length dimension L may be at least twice as great as the width dimension W and/or at least twice as great as the depth dimension D. In some further examples, the length dimension L may be at least five times as great as the width dimension W and/or at least five times as great as the depth dimension D. In some implementations, the length dimension L is in the region of 125 millimeters to 100 meters, the width dimension W is in the region of 100 to 300 millimeters and the depth dimension D is in the region of 100 to 500 millimeters.

As in the first, second, third and fourth examples 34, 134, 234, 334 of the linear rocket motor, the casing 440 in the fifth example 434 comprises a base 435, a front wall 439a, two side walls 436, 437, a rear wall 439b and an upper wall 443. However, in this fifth example, the two side walls 436, 437 do not define a rocket nozzle unlike in the first, second, third and fourth examples 34, 134, 234, 334. In the fifth example the two side walls 436, 437 are substantially planar. The side walls 436, 437 are substantially parallel to one another, substantially orthogonal to the front and rear walls 439a, 439b and substantially orthogonal to both the base 435 and the upper wall 443.

The base 435 and the upper wall 443 are substantially planar in the illustrated example. The base 435 and the upper wall 443 are substantially parallel to one another, substantially orthogonal to the front and rear walls 439a, 439b and substantially orthogonal to each of the side walls 436, 437.

The front wall 439a and the rear wall 439b are substantially planar in the illustrated example. The front wall 439a and the rear wall 439b are substantially parallel to one another, substantially orthogonal to the side walls 436, 437 and substantially orthogonal to the base 435 and the upper wall 443.

The upper wall 443 comprises a plurality of gas exit apertures 401a, 401b, 401c, 401d, 401e, 401f, 401g, 401h, 401i. In this example, the length of each of the apertures 401a-401i is aligned with the length dimension L of the rocket motor 434. Some or all of the gas exit apertures 401a-401i may diverge in the direction of movement of gas ejected from the casing 440 in operation.

In the illustrated example, the upper wall 443, the side walls 436, 437 and the base 435 are integrally formed, for example, using an extrusion process. Each of the front wall 439a and the rear wall 439b is partially formed from an edge of each of the upper wall 443, the side walls 436, 437 and the base 435 and also by a surface of an end cap 409a, 409b. The end cap 409b which forms part of the rear wall 439b can be seen in FIG. 7.

The end cap 409b includes an ignition connection 421 for an igniter 420 of the linear rocket motor 434. The igniter 420 is arranged to ignite propellant located inside the casing 440 of the linear rocket motor 434, which causes gas to be ejected from the casing 440 via the gas exit apertures 401a-401i and which, in turn, causes a force to be generated that is substantially perpendicular to the length dimension L of the casing 440 (and substantially aligned with the depth dimension D).

FIG. 8 illustrates some component parts of the fifth example 434 of a linear rocket motor 434. FIG. 9 illustrates a cross section of the fifth example 434 of a linear rocket motor. FIG. 10 illustrates a plan view of the fifth example 434 of a linear rocket motor.

In order to show the component parts in FIG. 8, the side walls 436, 437, the base 435 and the upper wall 443 have been removed. It can be seen in FIG. 8 that the igniter 420 extends across the length dimension L of the linear rocket motor 434 from one end cap 409a to the other end cap 409b.

In the illustrated example, a (substantially planar) filter 410 is present which is positioned above the igniter 420. Solid propellant (for example in pellet form, as described above in relation to the first example 34 of the linear rocket motor) may be positioned around the igniter 420.

The filter 410 is positioned between the propellant (not shown) and the gas exit apertures 401a-401i to prevent unburnt propellant (for instance, unburnt pellet pieces) from being ejected through the gas exit apertures 401a-401i in operation.

FIG. 11 illustrates a portion of the filter 410 in more detail. The filter 410 comprises a plurality of apertures 411 which enable gas to pass through the filter but prevent chunks of unburnt propellant from passing through. The filter 410 also comprises a plurality of protrusions 412 which abut the inner surface of the upper wall 443.

Figure 12:
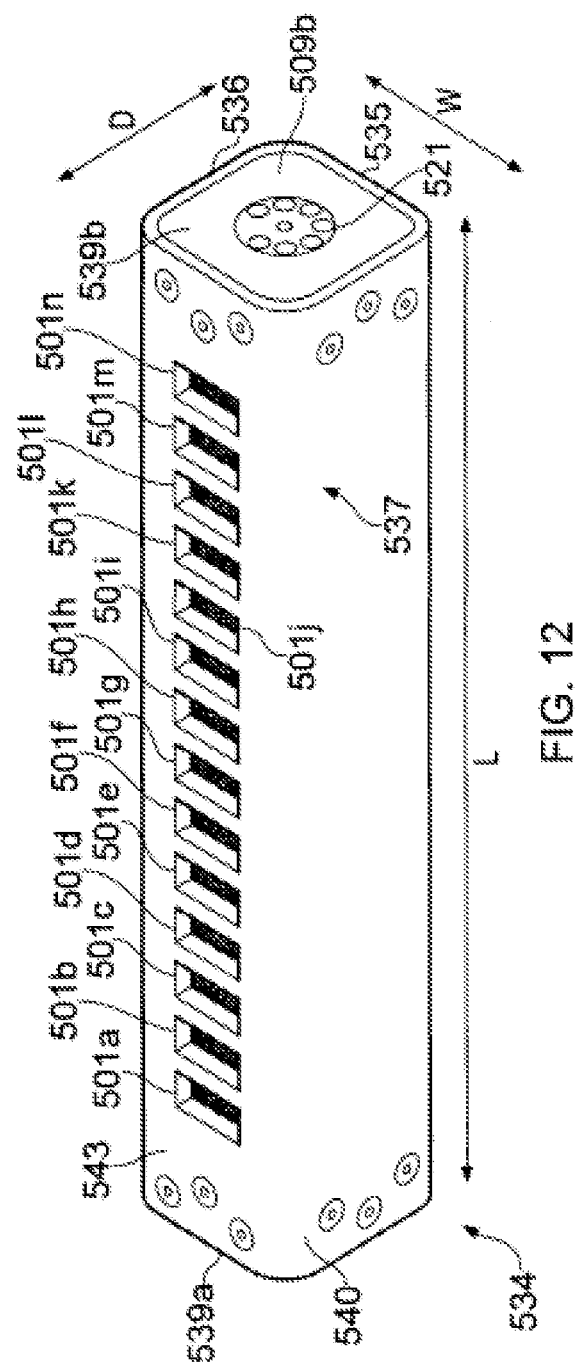
FIG. 12 illustrates a plan view of a sixth example of a linear rocket motor.

FIG. 12 illustrates a perspective view of a sixth example 534 of a linear rocket motor. The sixth example 534 is the same as the fifth example 434 save for the orientation of the gas exit apertures 501a, 501b, 501c, 501d, 501e, 501f, 501g, 501h, 501i, 501j, 501k, 5011, 501m, 501n. In the sixth example 534, the length of the gas exit apertures is orthogonal to the length dimension of the casing 540, rather than parallel to it.

The reference numerals 509b, 521, 535, 536, 537, 539a, 539b and 543 in FIG. 12 designate an end cap 509b, an ignition connection 521, a base 535, a first side wall 536, a second side wall 537, a front wall 539a, a rear wall 539b and an upper wall 543 respectively.

Figure 13:
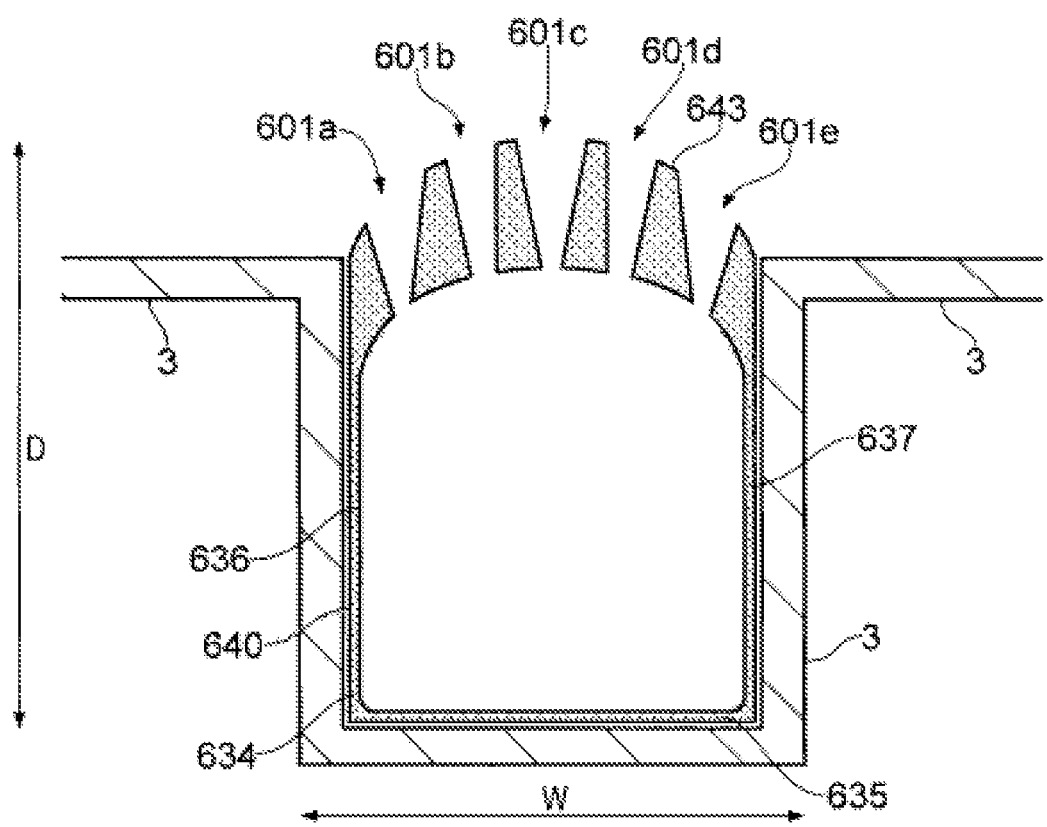
FIG. 13 illustrates a cross section of a seventh example of a linear rocket motor.

FIG. 13 illustrates a cross section of a seventh example 634 of a linear rocket motor. The seventh example 634 of a linear rocket motor is similar to the first, second, third, fourth, fifth and sixth examples 34, 134, 234, 334, 434, 534 in that it has approximately the same elongate shape.

The casing 640 of the seventh example 634 has a similar cross sectional shape to the fifth and sixth examples 434, 534, but differs in from them in that it has deeper gas exit apertures 601a, 601b, 601c, 601d, 601e which are diverging in shape. The seventh example 634 of a linear rocket motor also differs from the fifth and sixth examples 434, 534 in that the upper surface 643 is curved rather than planar.

In the illustration, the seventh example 634 of a linear rocket motor is shown being supported by an outer surface of an armoured vehicle ballistic shell 3. This may advantageously enable some parts of the casing 640 of the rocket motor 634 to be thinner than in some of the other examples, such as the base 635 and the side walls 636, 637.

Figure 14:
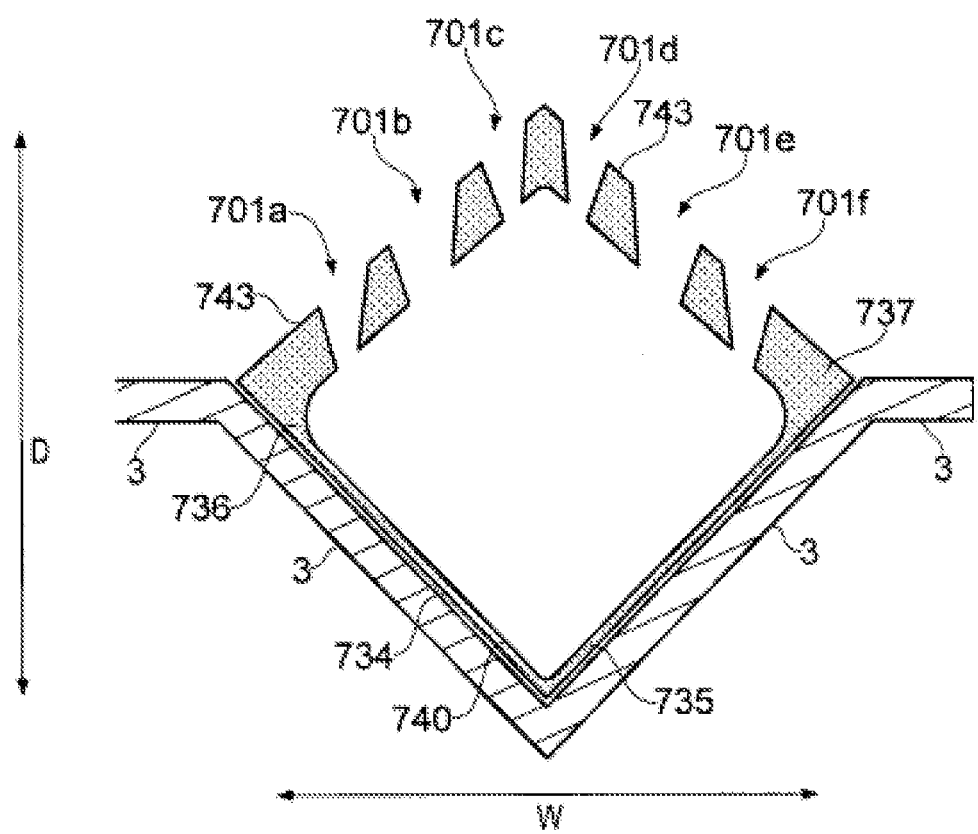
FIG. 14 illustrates a cross section of an eighth example of a linear rocket motor.

FIG. 14 illustrates a cross section of an eighth example 734 of a linear rocket motor. The eighth example 734 of a linear rocket motor is similar to the first, second, third, fourth, fifth, sixth and seventh examples 34, 134, 234, 334, 434, 534, 634 in that it has approximately the same elongate shape.

The eighth example 734 differs from the other examples 34, 134, 234, 334, 434, 534, 634 in that the base 735 of the casing 740 is v-shaped rather than planar. The eighth example 734 also differs from the other examples 34, 134, 234, 334, 434, 534, 634 in that the upper surface 743 of the casing is v-shaped rather than planar or curved. The side walls labelled with the reference numerals 736 and 737 link the base 735 to the upper surface 743. The gas exit apertures in the upper surface 743 of the casing 740 are labelled with the reference numerals 701a, 701b, 701c, 701d, 701e and 701f.

The eighth example 734 of a linear rocket motor is shown being supported by an outer surface of an armoured vehicle ballistic shell 3 in FIG. 14. As mentioned above in relation to FIG. 13, this may advantageously enable some parts of the casing 740 of the rocket motor 734 to be thinner than in some of the other examples, such as the base 735.

Figure 15:
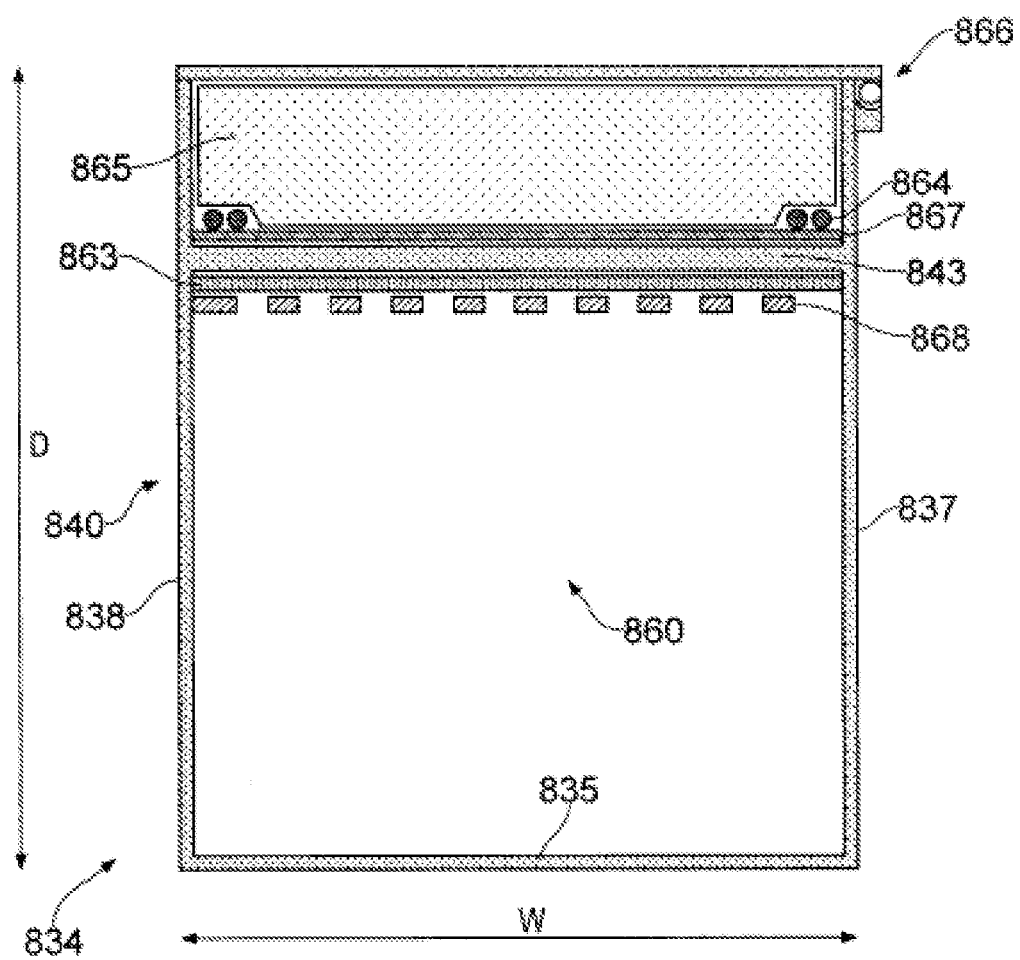
FIG. 15 illustrates a first cross section of a ninth example of a linear rocket motor.
Figure 16:
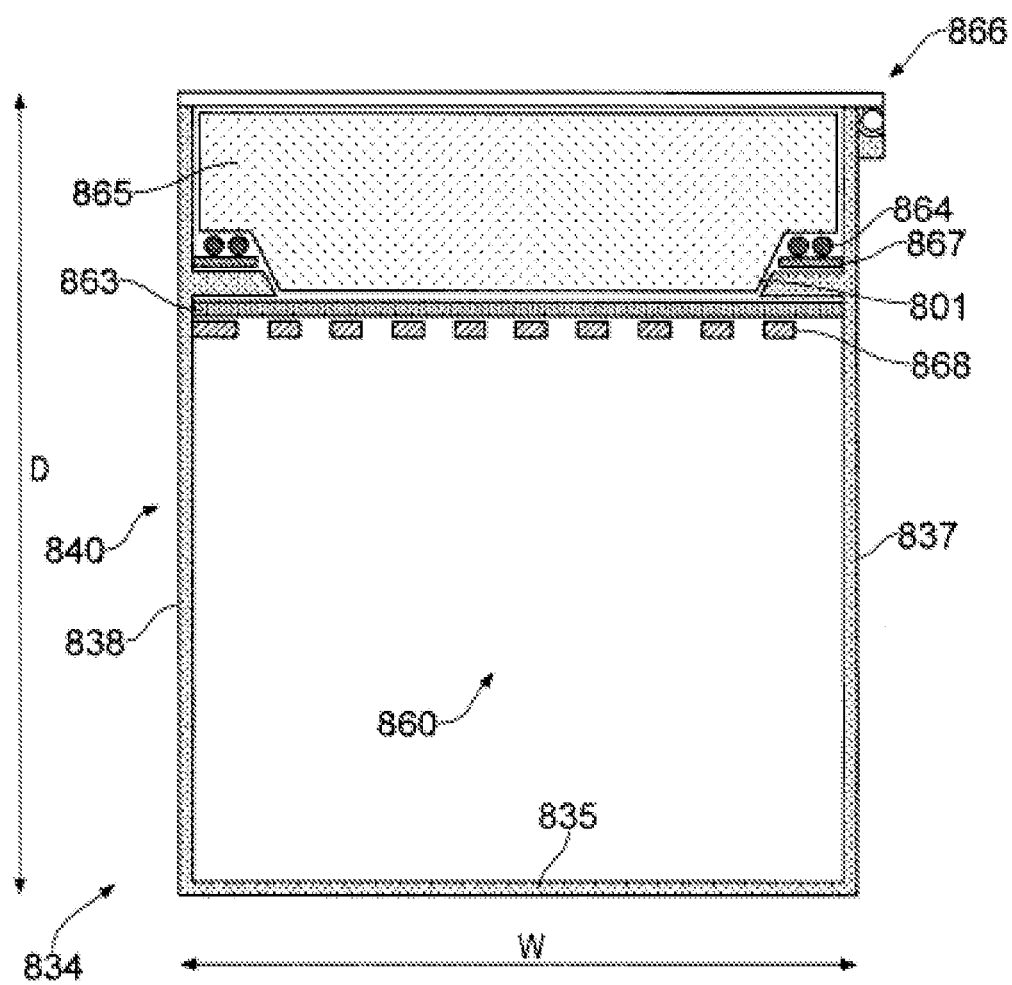
FIG. 16 illustrates a second cross section of the ninth example of a linear rocket motor.

FIGS. 15 and 16 illustrate first and second cross sections of a ninth example 834 of a linear rocket motor. The ninth example 834 of a linear rocket motor is similar to the first, second, third, fourth, fifth, sixth, seventh and eighth examples 34, 134, 234, 334, 434, 534, 634, 734 in that it has approximately the same elongate shape.

In the ninth example 834 of a linear rocket motor, the upper surface 843 of the rocket motor 834 comprises a plurality of gas exit apertures 801. Each gas exit aperture 801 has a length which is orthogonal to the length dimension of the casing 840 of the rocket motor 834.

FIG. 15 is a cross section through the upper surface 843 of the rocket motor 834 and FIG. 16 is a cross section through a gas exit aperture 801 in the upper surface 843.

The ninth example 834 of the linear rocket motor is similar to the sixth example 534 in that it includes a similar base 835, similar side walls 837, 838 and a similar upper surface 843 with gas exit apertures 801, each of which has a length that is orthogonal to the length dimension of the casing 840 of the rocket motor 834.

The ninth example 834 is different from the sixth example in that the side walls 837, 838 of the casing 840 extend beyond the upper surface 843 and, together with a protective hinged cover 866, define a compartment in which non-gaseous matter 865 (formed from solid and/or liquid) for ejection from the rocket motor 834 is located. In this regard, the ninth example 834 of the rocket motor is similar to the second and third examples 134, 234.

The ninth example 834 of the rocket motor comprises a first propellant material 867 and a second propellant material 860. The first propellant 867 may, for example, be a high explosive in sheet form. The second propellant 860 may, for example, be a non-detonating propellant. The second propellant 860 may be a solid propellant that has the same or a similar form to the propellant 60 described above in relation to the first example 34.

The first propellant 867 is arranged to eject the non-gaseous matter 865 from the rocket motor 834 in order to generate a first force. The second propellant 860 is arranged, following the ejection of non-gaseous matter from the rocket motor, to cause ejection of gas from the rocket motor 834 to generate a second force.

In operation, detonating cord 864 positioned close to the first propellant material 867 is used to detonate the first propellant material 867, which causes the non-gaseous matter 865 to be ejected from the rocket motor 834. Ignition of the first propellant material 867 causes an igniter 863, having a sheet form, to ignite which in turn ignites the second propellant material 860.

The ninth example 834 of the rocket motor further comprises one or more filters 868 which are positioned between the gas exit apertures 801 and the first propellant material 860. The one or more filters 868 prevent unburnt propellant (for example, unburnt pellet pieces) from the first propellant material 860 from being ejected from the rocket motor 834.

II. Counteracting an Explosion Underneath a Vehicle

An explosive event can cause significant trauma to a vehicle and/or a vehicle's occupants. In order to protect the occupants of the vehicle from shrapnel and blast emanating from an explosive such as a bomb, mine or improvised explosive device (IED), some vehicles comprise armour.

The armour may protect the occupants against injury caused directly from the shrapnel and blast effects. However, depending upon the size of the explosive, some aspects of the vehicle (such as the floor of the vehicle if the explosion occurs underneath the vehicle) can be very heavily damaged. Furthermore, an explosion underneath or to the side of a vehicle may cause the vehicle to accelerate rapidly into the air, resulting in injury to the occupants either when being accelerated upwards or when the vehicle lands on the ground.

Some explosive devices may, for example, include a combination of an explosively formed penetrator/projectile (EFP) and a mine for producing a blast charge.

Detonation of an appropriately positioned EFP may cause a projectile to be directed towards the underside of a vehicle. In order to counteract the effects of such an EFP, the vehicle may include an armoured belly plate.

The detonation of a mine generates an initial shockwave which is very quickly followed by a blast wave. If the detonation occurs underneath the vehicle, these events cause damage to the vehicle and contribute to the vehicle being accelerated upwards into the air.

Immediately after the explosion occurs, there is an input of energy from the initial shockwave, the following reflected pressure waves, ejecta, and from localised very high pressure gas. Over the next few milliseconds, the gases produced by decomposition of the explosive from the mine expand underneath the vehicle and together with other contributors (to the total impulse imparted to the vehicle) may apply a large enough force to cause the vehicle to accelerate upwards into the air and fall onto its side or top. The effect of the expanding gases can be likened to a large airbag expanding very rapidly under the vehicle.

If the mine is buried very shallowly on very hard ground, the upwards force that is generated by the expanding gases is at maximum for around 5 milliseconds or so, and then rapidly reduces in value over the next 5 milliseconds to near zero. However, if the ground is softer and the mine is more deeply buried, the total time over which a particularly significant upwards force is exerted on the vehicle might generally be around 20-30 milliseconds.

Furthermore, in the case of a very deeply buried mine, gas escaping from the ground and the ejecta carried with it may continue to provide an impulse to the vehicle for another 30-500 milliseconds or so, depending on the depth of the burial of the explosive and the soil type and condition. The proportion of the total impulse imparted to the vehicle by the ejecta is very variable. If the mine is buried very deeply in a culvert under a road, practically all of the impulse may arise from the ejecta. If the mine is located on the top of a hard surface there may be very little or no contribution from the ejecta, and practically all of the lifting impulse will be generated by the gas pressure.

Some embodiments of the invention relate to an apparatus for mitigating the damage caused to a vehicle by an explosion, intercepting the associated blast wave and stabilizing the vehicle in response to the explosion. Advantageously, these embodiments of the invention may enable injury to the vehicle's occupants to be prevented or limited and enable the vehicle to remain upright and in fighting condition.

Figure 17:
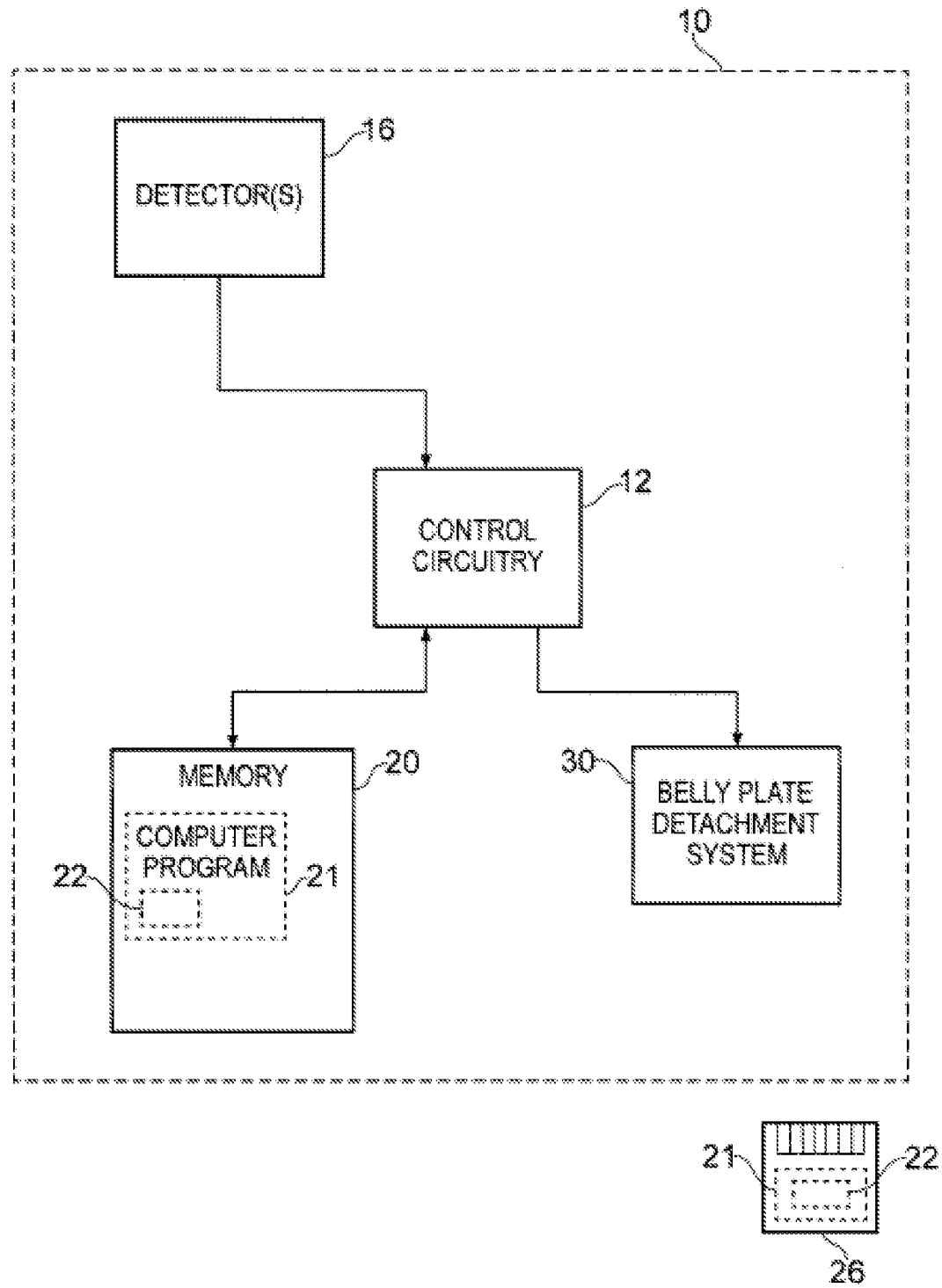
FIG. 17 illustrates a first apparatus.

FIG. 17 illustrates an apparatus 10 for mitigating the damage caused to a vehicle by an explosion, intercepting the blast wave produced by the explosion and for stabilizing the vehicle in response to the explosion. The apparatus 10 may be applied to a vehicle during manufacture or post manufacture. The apparatus 10 may, for example, be a kit of parts. The vehicle may be a land-based armoured vehicle. For example, the vehicle may be a civilian car, a modified sports utility vehicle, or a military armoured vehicle such as a personnel carrier or a tank.

The apparatus 10 comprises control circuitry 12, one or more detectors 16, a memory 20 and a belly plate detachment system 30. The control circuitry 12 may, for example, be or comprise a single processor or multiple processors.

The control circuitry 12 is configured to receive inputs from the detector(s) 16. The control circuitry 12 is configured to provide outputs to the belly plate detachment system 25. The control circuitry 12 is also configured to write to and read from the memory 20.

The detectors 16 may be any type of detectors suitable for detecting that an explosion has occurred local to (for example, underneath) a vehicle. The detectors 16 may, for example, include: one or more pressure detectors, one or more temperature detectors and/or one or more light detectors.

The pressure detectors may, for example, be piezoelectric pressure detectors. Advantageously, piezoelectric pressure detectors operate effectively in adverse weather and ground conditions.

Alternatively or additionally, the detectors 16 may include one or more break wire detectors. An explosion may cause a circuit of such a break wire detector to break, causing the break wire detector to provide an input to the processor 12.

Alternatively or additionally, the detectors 16 may include one or more ionisation detectors for detecting ionised particles that result from an explosion.

Alternatively or additionally, the detectors 16 may comprise one or more electromagnetic pulse detectors for detecting an electromagnetic pulse resulting from an explosion.

Alternatively or additionally, the detectors 16 may comprise one or more accelerometers and/or one or more gyroscopes.

The memory 20 stores a computer program 21 comprising computer program instructions 22. The computer program instructions 22 control the operation of the apparatus 10 when loaded into the control circuitry 12. The computer program instructions 22 provide the logic and routines that enables the apparatus 10 to perform the method illustrated in FIG. 20.

The computer program may arrive at the apparatus 10 via any suitable delivery mechanism 26. The delivery mechanism 26 may be, for example, a (non-transitory) computer-readable storage medium, a computer program product, a memory device or a record medium such as a CD-ROM or DVD. The delivery mechanism may be a signal configured to reliably transfer the computer program instructions 22.

In an alternative implementation, the control circuitry 12 and/or the memory 20 may be provided by an application specific integrated circuit (ASIC).

Figure 18:
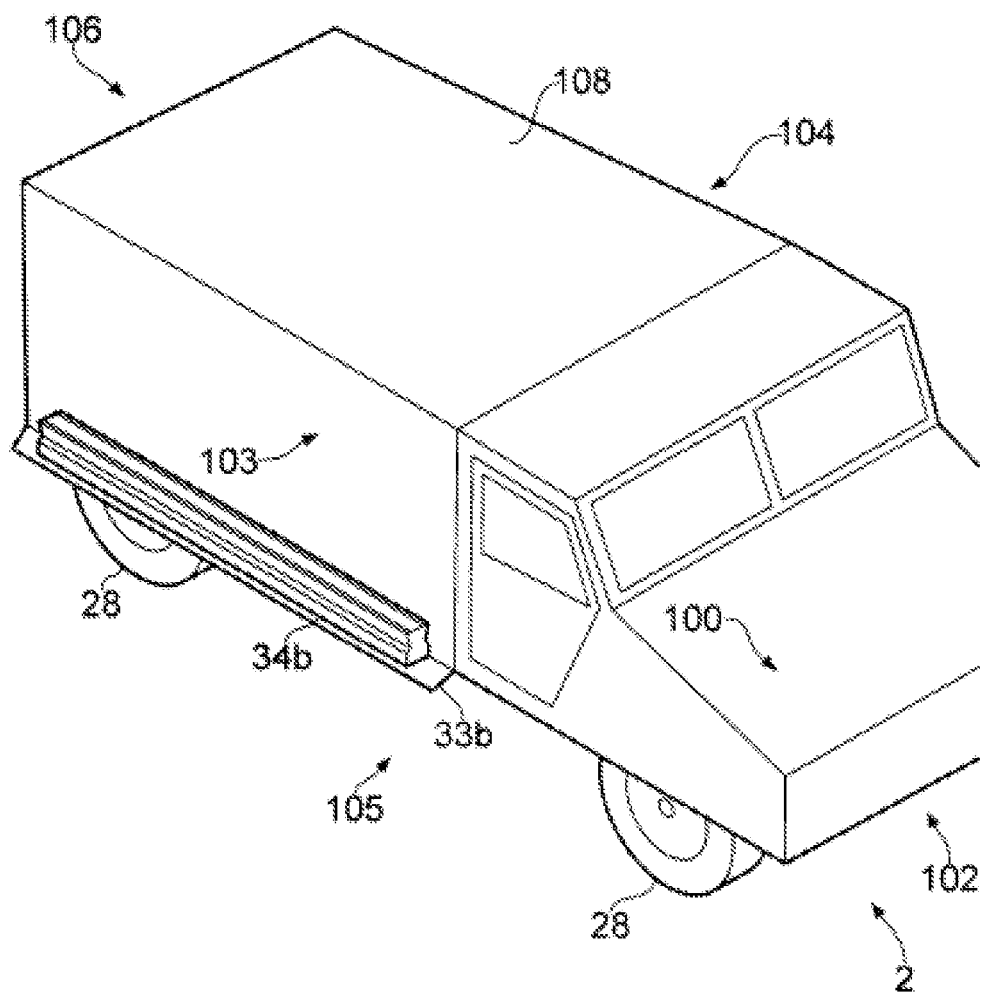
FIG. 18 illustrates a perspective view of a first armoured vehicle.

FIG. 18 illustrates a perspective view of a vehicle 2 that comprises the apparatus 10 illustrated in FIG. 17. The illustrated vehicle 2 further comprises a body 100 and wheels 28. The illustrated vehicle 2 comprises four wheels 28, but in other implementations of the invention, the vehicle 2 may include a different quantity of wheels and/or may include tracks. The reference numerals 102, 103, 104, 105 and 106 in FIG. 18 designate the front, the first side, the second side, the underside and the rear of the vehicle 2 respectively. The detectors 16 of the apparatus 10 may, for example, be situated on the underside 105 of the vehicle 2.

The body 100 of the vehicle 2 defines an internal enclosure for housing occupants of the vehicle 2. In the FIG. 18 example, the vehicle 2 has a roof 108. In other examples, the vehicle 2 might not have a roof 108.

Figure 19:
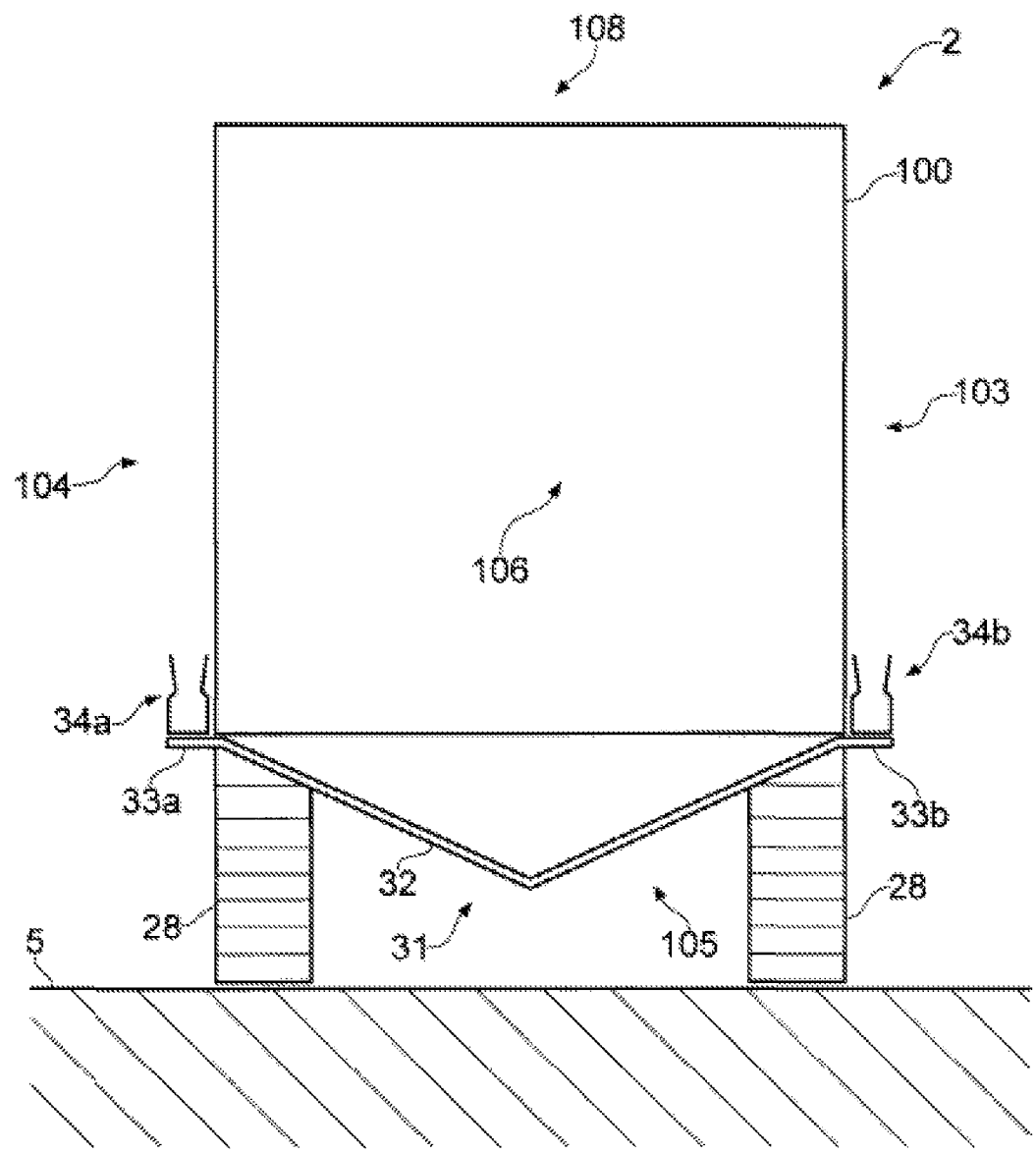
FIG. 19 illustrates a rear view of the first armoured vehicle.

FIG. 19 illustrates a rear view of the vehicle 2 illustrated in FIG. 18. It can be seen from FIG. 19 that the vehicle 2 comprises a belly plate 31 comprising a v-shaped portion 32 and first and second flange portions 33a, 33b. The flange portions 33a, 33b are positioned outside the body 100 of the vehicle 2. The belly plate 31 may, for example, be attached to the body 100 of the vehicle 2 using one or more explosive bolts or Velcro®.

First and second linear rocket motors 34a, 34b, having the same form as any of the first, second, third, fourth, fifth, sixth, seventh, eighth and ninth examples 34, 134, 234, 334, 434, 534, 634, 734, 834 of linear rocket motors illustrated in FIGS. 1, 2 and 4 to 16 are positioned on the first and second flange portions 33a, 33b respectively. The belly plate 31 and the first and second linear rocket motors 34a, 34b can be considered to form the belly plate detachment system 30 illustrated in FIG. 17.

The linear rocket motors 34a and 34b are configured to generate a groundwards force in response to detection of an explosion local to the vehicle 2, which causes at least partial detachment of the belly plate 31 from the vehicle 2 and prevents (or mitigates) upwards acceleration of the vehicle 2 which would otherwise be caused by the explosion. The generated groundwards force may also prevent or mitigate damage to the internal floor of the vehicle 2.

In some embodiments, the belly plate 31 is fully detached from the vehicle 2. In other embodiments, the belly plate 31 is partially, but not fully, detached from the vehicle 2. For example, in these embodiments, the belly plate 31 may be directed away from the underside 105 of the vehicle 2 but retained by the vehicle 2 using one or more tethers (e.g. one or more chains or extendable links).

The (at least partially) detached belly plate 31 is effectively a heavy barrier projected towards the source of the explosion. This may advantageously counteract the blast wave produced by the explosion. The belly plate 31 may, for example, delay the impact that the blast wave has on the vehicle 2, allowing the very high pressure "gas and ejecta bubble" formed within (for instance) the first millisecond or so of the blast event to expand further before it impacts the vehicle, hence reducing its pressure.

The length of the one or more tethers may be such that the belly plate 31 does not reach the ground when it is projected towards the source of the explosion. The tethers between the belly plate 31 and the body 100 of the vehicle 2 may act to mitigate or prevent upwards acceleration of the vehicle 2.

In some embodiments, the vehicle may comprise a further belly plate situated above the belly plate 31. One or more crushable materials may be positioned between the two belly plates. The one or more materials may include at least one ceramic material and/or at least one composite material. The one or more materials may include: alumina, silicon carbide, silicon nitride, one or more fibre reinforced composites such as aramid, para-aramid, polybenzoxazole, polyimides, polybenzimidazoles, ultra high molecular weight polyethylene (UHMWPE), and high molecular weight polypropylene. Other particulate or micro-tubular materials such as carbon fibre nanotubes or nanoparticles could also be used.

A method according to the embodiments of the invention will now be described in relation to FIG. 20. Initially, an explosion occurs underneath the vehicle 2. The explosion may, for example, include detonation of an explosively formed penetrator/projectile (EFP) and detonation of a mine.

The belly plate 31 provides the occupants of the vehicle 2 with protection against the projectile/penetrator of an EFP.

Detonation of the mine causes a blast shockwave. At block 701 of FIG. 20, the detectors 16 detect that an explosion has underneath the vehicle 2. If pressure detectors are used, the pressure detectors may detect that an increase in pressure has occurred, underneath the vehicle 2, as a result of the initial blast shockwave.

In response to detecting the increase in pressure, the pressure detectors provide an input to the control circuitry 12. The control circuitry 12 then analyses the input in order to determine whether the input is indicative of an explosion having occurred. An input provided by the detectors 16 following an explosion will have particular characteristics (and will reflect the characteristics of the initial shockwave). For example, if pressure detectors are used, the input from the pressure detectors may be indicative of a very large increase in pressure over a very short period of time.

Figure 20:
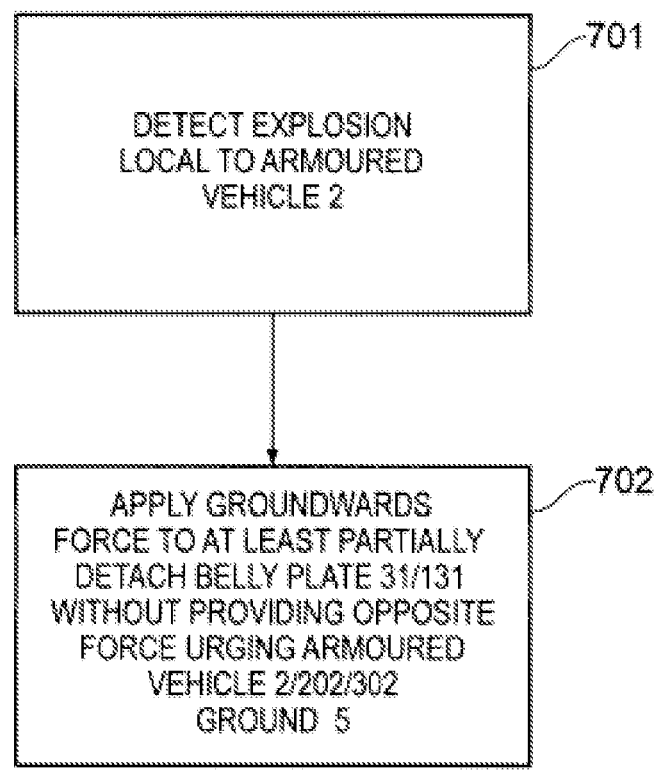
FIG. 20 illustrates a flow chart of a first method.

When the control circuitry 12 has determined that an explosion has occurred, it responds at block 702 of FIG. 20 by causing the linear rocket motors 34a, 34b to apply a groundwards force to at least partially detach the belly plate 31 from the vehicle 2, projecting the belly plate 31 towards the source of the explosion. Advantageously, the at least partially detached belly plate 31 "shields" the vehicle body 100 (at least in part) from the effects of the mine explosion and mitigates the effect that it has on the vehicle 2. This may advantageously enable the vehicle 2 to remain upright and in fighting condition.

In the event that the vehicle 2 comprises two belly plates with crushable materials situated therebetween, the crushable materials may crush in response to the upwards force provided by the explosion, absorbing energy and mitigating upwards acceleration of the vehicle 2.

The groundwards force that causes at least partial detachment of the belly plate 31 is applied by the linear rocket motors 34a, 34b without the linear rocket motors 34a, 34b exerting an opposite force that urges the body 100 of the armoured vehicle 2 away from ground 5. That is, the gas ejected from the linear rocket motors 34a, 34b does not exert an upwards force on the vehicle 2 because, advantageously, the linear rocket motors 34a, 34b and the propellant contained within them are positioned laterally along the sides 103, 104 of the body 100 rather than, for example, underneath the vehicle body 100. The exhaust gases from the linear rocket motors 34a, 34b therefore travel vertically past the body 100 of the vehicle 2 without exerting a force on it and urging it away from the ground 5.

The burn time of the linear rocket motors 34a, 34b may be set to match the time over which an explosion local to vehicle 2 might be expected to provide a significant upwards force on the vehicle 2, such as 20-50 milliseconds.

The combination of the first and second groundwards forces provided by the second, third and ninth examples 134, 234, 834 of the linear rocket motor which are produced by the ejection of a non-gaseous mass 65, 865 from the rocket motor followed by the ejection of gas from the rocket motor might advantageously be used to provide a groundwards impulse whose magnitude, over time, mirrors the upwards impulse caused by the explosion.

When an explosion local to a vehicle occurs, the ejection of the non-gaseous matter 65, 865 from the linear rocket motor 134, 234, 834 causes a short duration (e.g. 1-5 milliseconds), high magnitude groundwards force to be generated in response to the explosion, counteracting the strong initial upward forces that result from the explosion. The burning of the second propellant material 61, 860 causes a longer duration (e.g. 30-500 milliseconds), lower magnitude groundwards force to be generated that counteracts the longer duration upward forces that can result from some explosions. Thus, advantageously, the second, third and ninth linear examples 134, 234, 834 of the rocket motors illustrated in FIGS. 4, 5, 15 and 16 can be used to effectively mirror the force profile of mine explosions that generate a high initial upwards force which then reduces over time.

Figure 21:
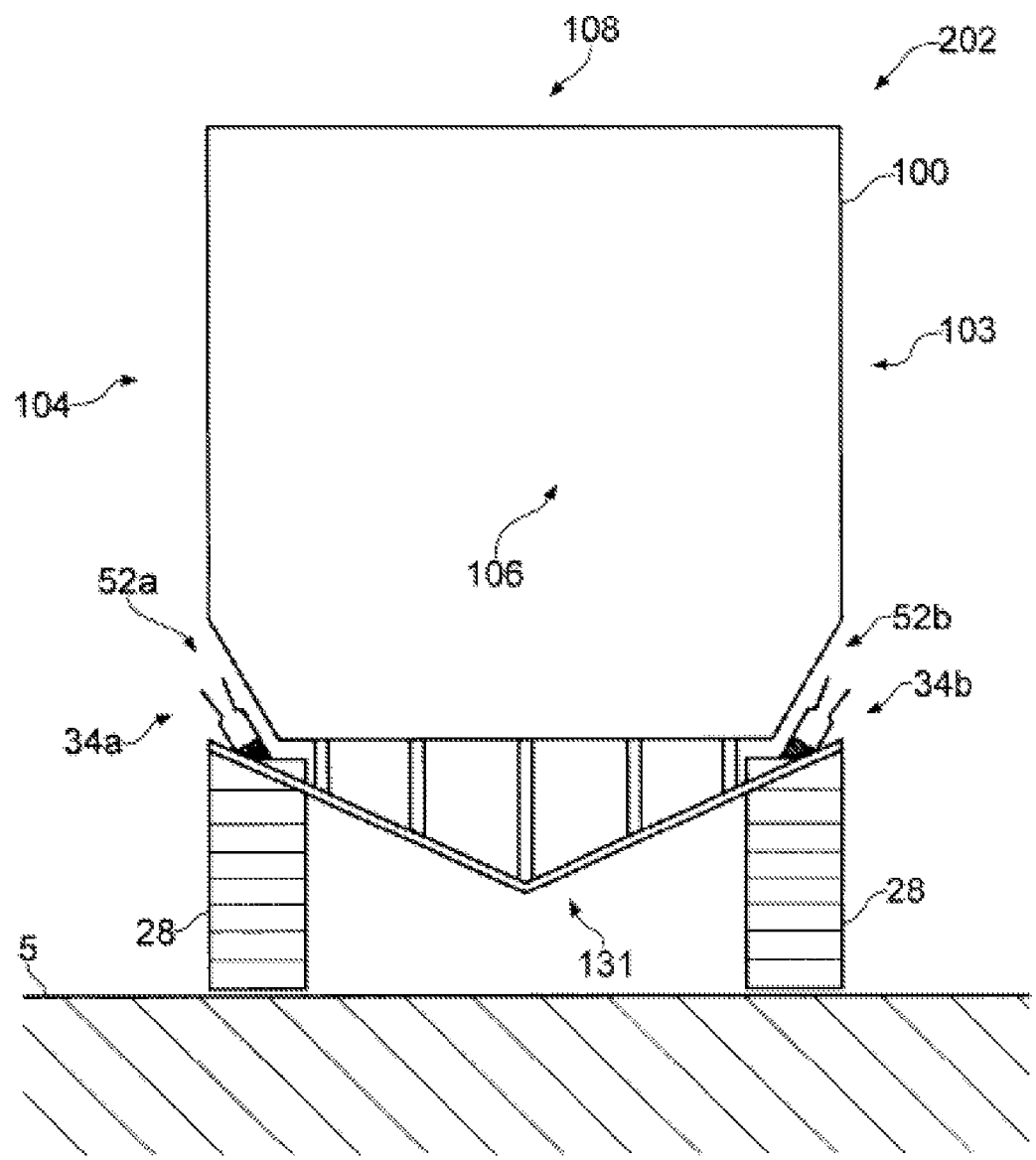
FIG. 21 illustrates a rear view of a second armoured vehicle.

FIG. 21 illustrates a rear view of a further armoured vehicle 202. The belly plate 131 of the vehicle 202 in FIG. 21 is substantially v-shaped and does not include the first and second flange portions 33a, 33b (illustrated in FIG. 19). In this example, the linear rocket motors 34a, 34b are positioned on the v-shaped belly plate 131 at least partially under the body 100 of the vehicle 202. The groundwards force that is generated by the linear rocket motors 34a, 34b is not perpendicular to the ground 5. In this implementation, the body 100 of the vehicle includes one or more exhausts 52a, 52b, to enable the exhaust gases from the linear rocket motors 34a, 34b to exit the vehicle 202 without them exerting an upwards force on it.

Figure 22:
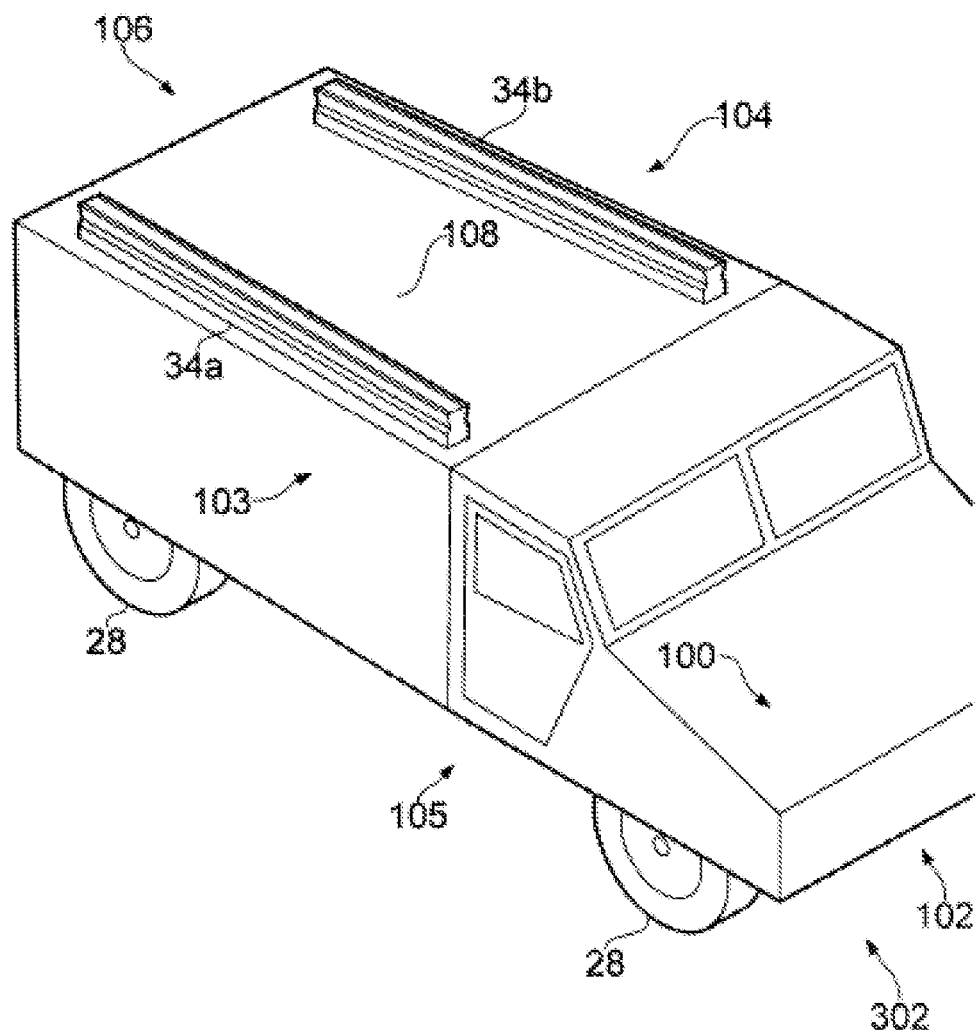
FIG. 22 illustrates a perspective view of a third armoured vehicle.

FIG. 22 illustrates an alternative implementation in which linear rocket motors 34a, 34b are placed on the roof 108 of a vehicle 302 rather than the belly plate. In this implementation, the activation of the linear rocket motors 34a, 34b causes a groundwards force to be applied to the vehicle body 100, mitigating or preventing the upwards acceleration of the vehicle 302 that would otherwise have been caused by the explosion.

Figure 23:
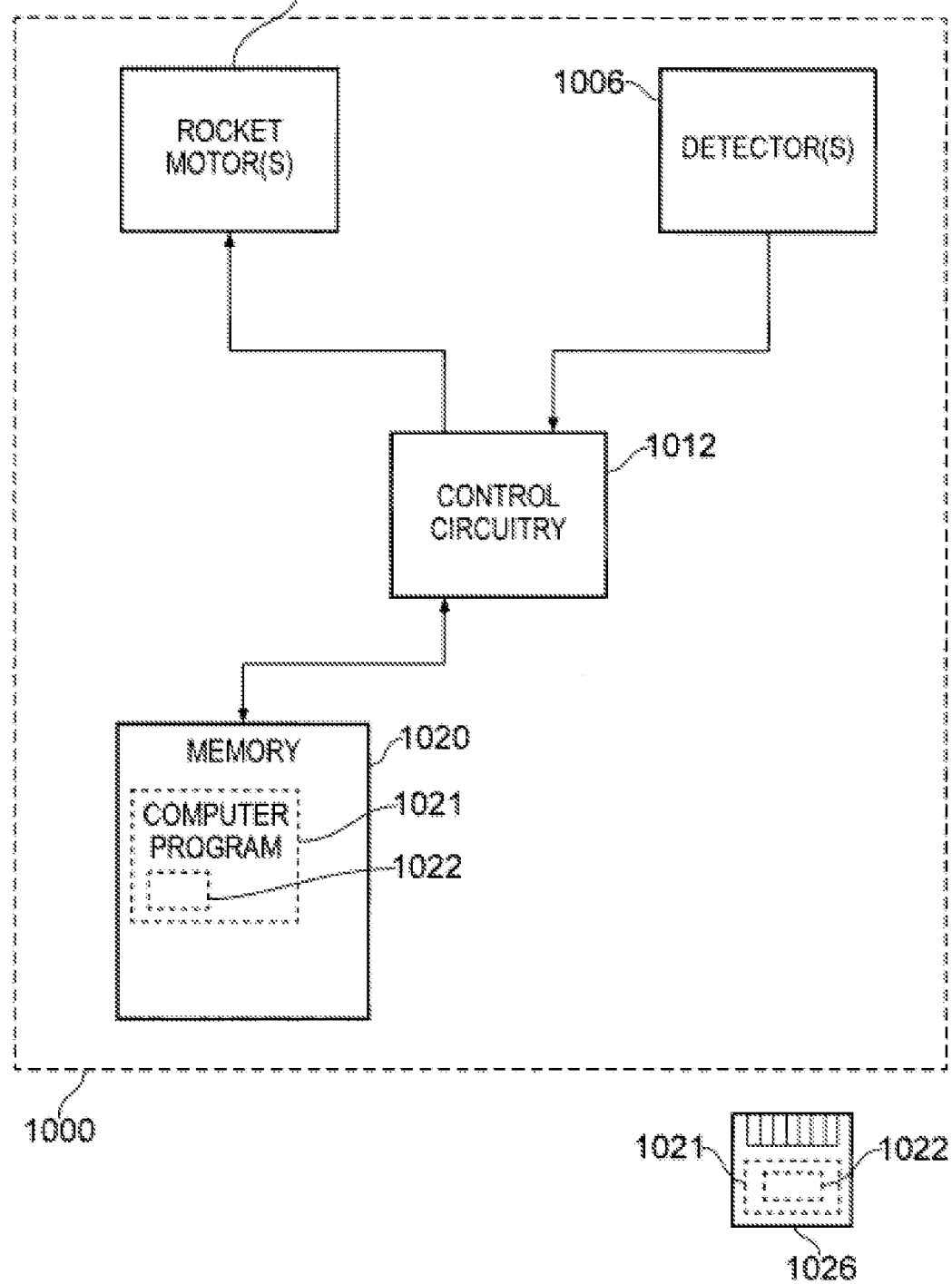
FIG. 23 illustrates a second apparatus.

III. Preventing or Reducing the Severity of a Collision Between an Aircraft and Ground FIG. 23 illustrates an apparatus 1000 for use in applying an upwards force to a descending aircraft operated by at least one pilot. The aircraft may be manned in that there is at least one pilot present in the aircraft. Alternatively, the aircraft may be unmanned and the pilot may be located remotely from the aircraft.

The apparatus 1000 may be applied to an aircraft during manufacture or post manufacture. The apparatus 1000 may, for example, be a kit of parts. The aircraft may, for example, be an airship, an aeroplane (such as a fighter jet), a helicopter or an unmanned aerial vehicle (UAV).

The apparatus 1000 comprises control circuitry 12, one or more detectors 1006, a memory 1020 and one or more rocket motors 34, 134, 234, 334, 434, 534, 634, 734, 834, 934. The one or more rocket motors 34, 134, 234, 334, 434, 534, 634, 734, 834, 934 could include any of the rocket motors described above or the rocket motor described below in conjunction with FIGS. 25 and 26.

The control circuitry 1012 may, for example, comprise one or more processors. The control circuitry 1012 is configured to receive inputs from the detectors 1006. The detectors 1006 may, for example, comprise one or more altimeters, and/or one or more radar arrangements such as a terrain following radar arrangement, and/or one or more engine failure detectors, an/or a fuel gauges.

The memory 1020 stores a computer program 1021 comprising computer program instructions 1022. The computer program instructions 1022 control the operation of the apparatus 1000 when loaded into the control circuitry 1012. The computer program instructions 1022 provide the logic and routines that enables the apparatus 1000 to perform the method illustrated in FIG. 24.

The computer program may arrive at the apparatus 1000 via any suitable delivery mechanism 1026. The delivery mechanism 1026 may be, for example, a (non-transitory) computer-readable storage medium, a computer program product, a memory device or a record medium such as a CD-ROM or DVD. The delivery mechanism may be a signal configured to reliably transfer the computer program instructions 1022.

In an alternative implementation, the control circuitry 1012 and/or the memory 1020 may be provided by an application specific integrated circuit (ASIC).

Figure 24:
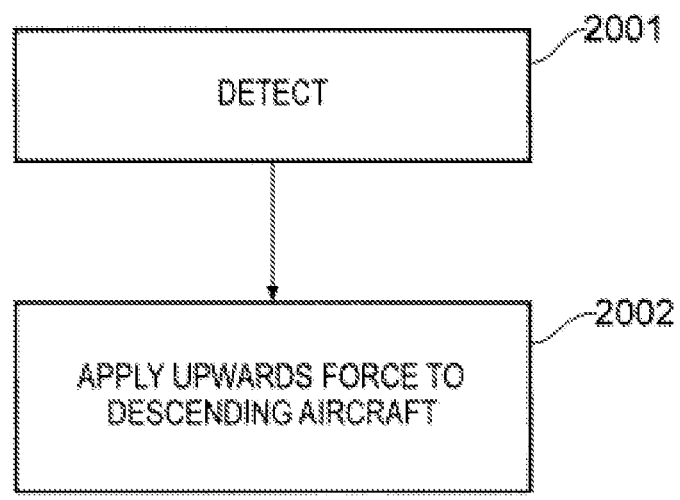
FIG. 24 illustrates a flow chart of a second method.

FIG. 24 illustrates a flow chart of a second method. At block 2001 in FIG. 24, the one or more detectors 1006 detect that an aircraft has entered a state in which an upwards force is required, or likely to be required in due course. For example, this could be because an altimeter or a radar arrangement has detected that the aircraft is flying too close to terrain or water. It may be because the rate of descent is above a threshold value and the altitude of the aircraft is below a threshold value. Alternatively, it could be because an engine of the aircraft, or an aspect of an engine of the aircraft, has failed. Alternatively, it could be because the aircraft has run out of fuel.

The one or more detectors 1006 provide an input to the control circuitry 1012. The input is then analysed by the control circuitry 1012 to determine when to cause an upwards force to be provided to the aircraft. This may be immediately, or after a period of time has elapsed.

At block 2002 in FIG. 24, the control circuitry 1012 causes the one or more rocket motors 34, 134, 234, 334, 434, 534, 634, 734, 834, 934 to apply an upwards force to the aircraft. The upwards force is applied when the one or more rocket motors 34, 134, 234, 334, 434, 534, 634, 734, 834, 934 eject gas towards ground.

The upwards force may, for example, be applied in response to detection of a potential collision by the detectors 1006. The potential collision could, for example, be a potential controlled or uncontrolled flight into terrain.

The application of the upwards force reduces the rate of descent of the aircraft and may, depending upon the aircraft, alter the pitch of the aircraft. Advantageously, the application of the upwards force may prevent a collision, or reduce the severity of the collision.

Figure 25:
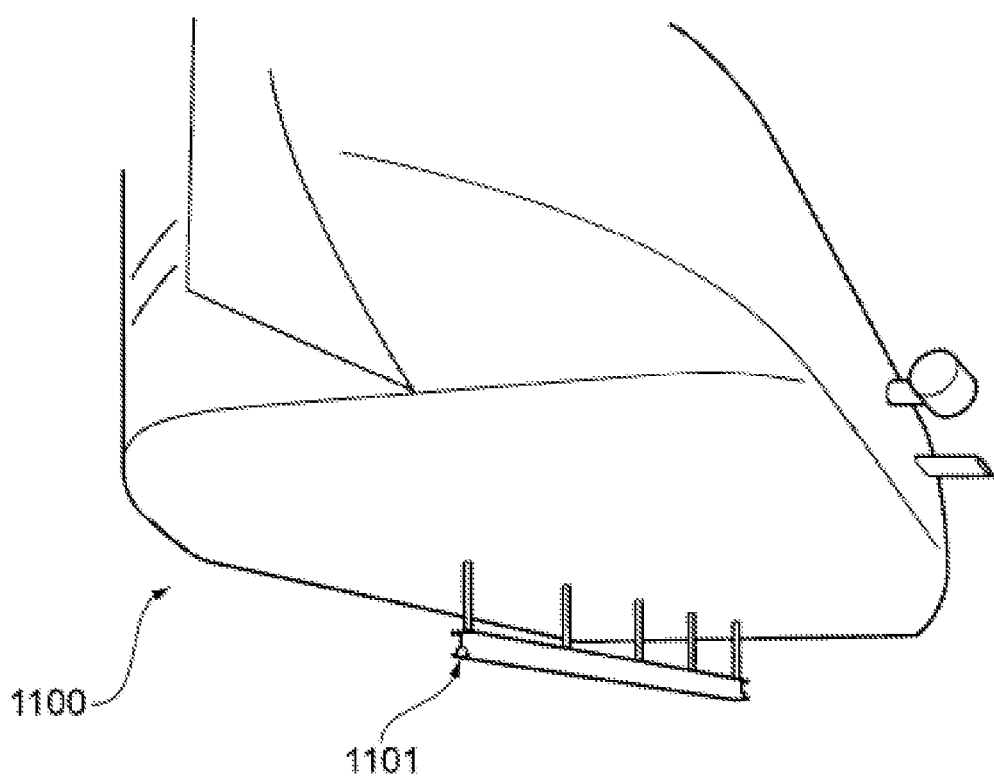
FIG. 25 illustrates a first aircraft, in the form of an airship, which comprises at least one rocket motor.
Figure 26:
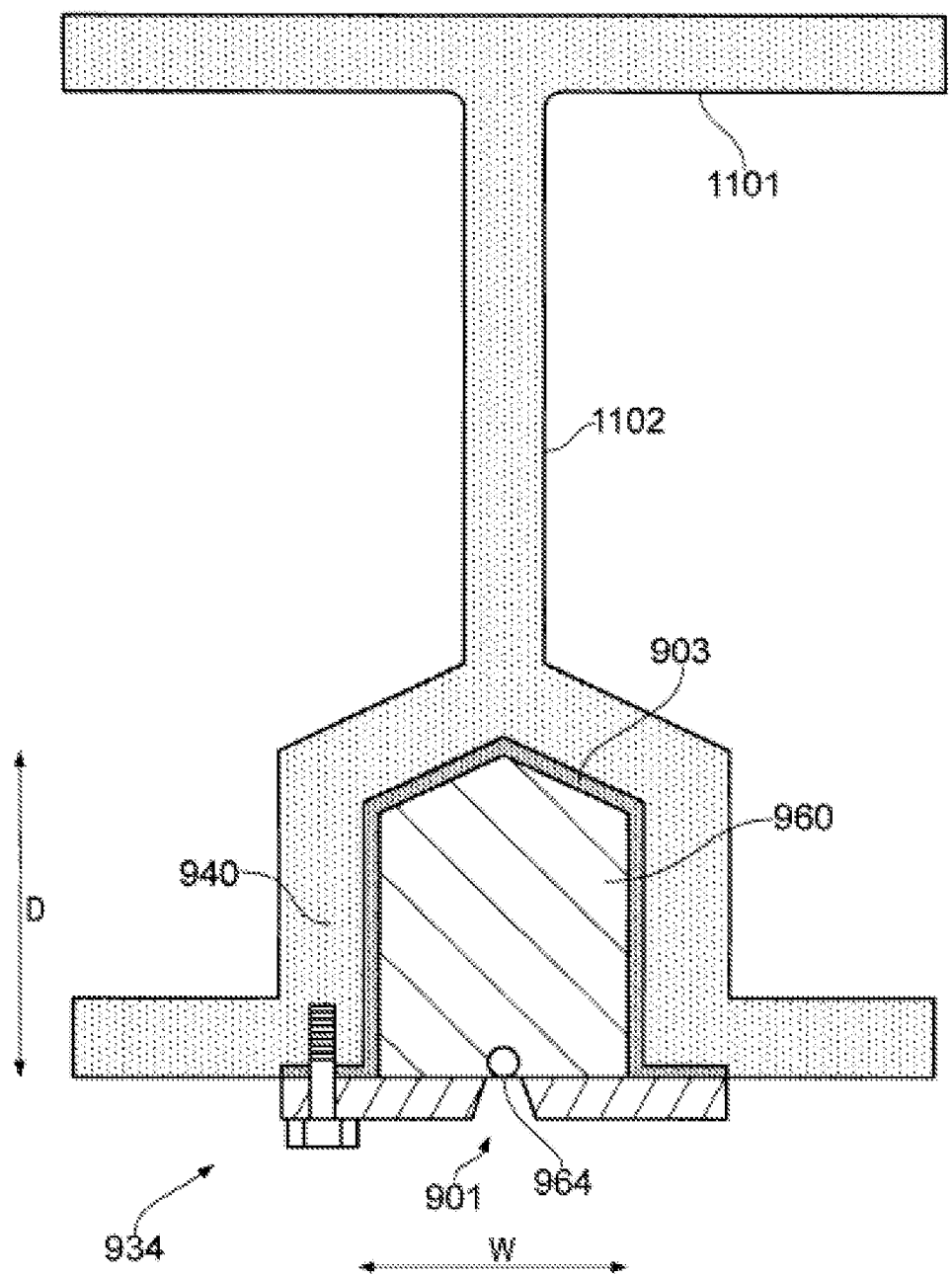
FIG. 26 illustrates a cross section of a tenth example of a linear rocket motor.

In the embodiment illustrated in FIGS. 25 and 26, the aircraft is an airship 1100. FIG. 25 illustrates the airship 1100. A tenth example 934 of the linear rocket motor is located on the underside of the airship. The tenth example 934 of the rocket motor is similar to the first, second, third, fourth, fifth, sixth, seventh, eighth, ninth and tenth examples 34, 134, 234, 334, 434, 534, 634, 734, 834 in that it has approximately the same elongate shape.

The airship 1100 comprises a load carrying beam 1101 which is connected to the tenth example 934 of the linear rocket motor by an interconnecting member 1102. A cross section of the load carrying beam 1101, the interconnecting member 1102 and the tenth example 934 of the linear rocket motor is illustrated in FIG. 26. The airship 1100 may include one or multiple rocket motors 934 located along the length of the load carrying beam 1101 in the manner illustrated in FIG. 26.

The interconnecting member 1102 extends downwardly from the load carrying beam 1101 and to the linear rocket motor 934. In the illustrated example, the load carrying beam 1101, the interconnecting member 1102 and a casing 940 of the linear rocket motor 934 are integrally formed. The linear rocket motor 934 comprises an inner insulating layer 903 that insulates a structural portion 1102 of the load carrying beam 1101 from heat generated by the linear rocket motor 934 in operation.

The width W and depth D dimensions of the rocket motors are indicated on FIG. 26. The rocket motor 934 is elongate in shape and the length dimension L is directed into and out of the page.

The linear rocket motor 934 further comprises an igniter 964, propellant 960 and a diverging gas exit aperture 901. It can be seen in FIG. 26 that the gas exit aperture diverges in the direction of movement of gas ejected from the casing 940 in operation.

In this embodiment, the airship 1101 comprises one or more thrusters (such as electrical propulsors), different from the linear rocket motor 934, that are used to generate lift when the airship takes off.

The linear rocket motor 934 may be used to provide lift when the airship 1100 is landing, as a matter of routine and/or in an emergency. In this regard, the detectors 1006 on the airship 1100 may provide inputs, as described above in relation to FIGS. 23 and 24, to enable the control circuitry 1012 to determine when the linear rocket motor(s) 934 should be used to apply an upwards force to the airship 1100 to reduce its rate of descent.

Figure 27:
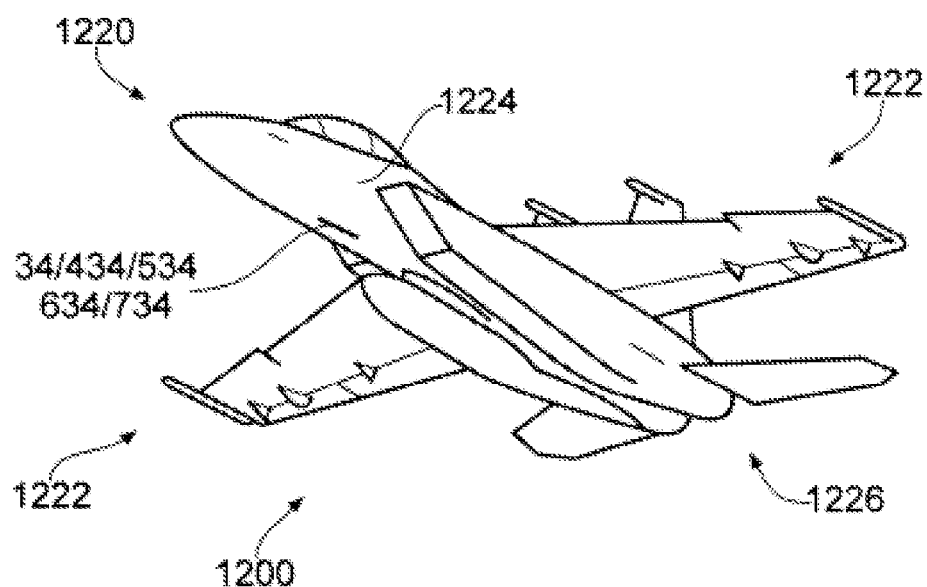
FIG. 27 illustrates a second aircraft, in the form of a fighter jet, which comprises at least one rocket motor.

FIG. 27 illustrates an embodiment in which the aircraft is an aeroplane 1200 in the form of a fighter jet. The aeroplane 1200 comprises a body/fuselage 1224. The fuselage 1224 includes a nose 1220 and a rear 1226. Wings 1222 extend outwardly from the fuselage 1224.

The aeroplane 1200 further comprises one or more rocket motors. The rocket motor(s) might, for example, be any of the first, fifth, sixth, seventh or eighth examples 34, 434, 534, 634, 734 of linear rocket motor described above. The one or more rocket motors are configured to apply an upwards force to the fuselage 1224 of the aeroplane 1200.

The one or more rocket motors 34, 434, 534, 634, 734 are positioned on an underside of the fuselage 1224 of the aeroplane 1200, between the nose 1220 of the aeroplane 1200 and the wings 1222. The aeroplane 1200 may include one or more channels in the fuselage 1224 which enables gas ejected from the rocket motor(s) 34, 434, 534, 634, 734 to exit a lower surface of the fuselage 1224.

The positioning of the rocket motor(s) 34, 434, 534, 634, 734 on the underside of the fuselage 1224, between the nose 1220 and the wings 1222 means that when an upwards force is applied to the fuselage 1224 of the aeroplane 1200, the pitch of the aeroplane 1200 is altered. Upon application of the upwards force, the aeroplane 1200 is rotated about an lateral axis which extends across the wings, such that the nose 1220 moves upwardly about the lateral axis and the rear 1126 of the fuselage 1224 moves downwardly about the lateral axis.

Figure 28:
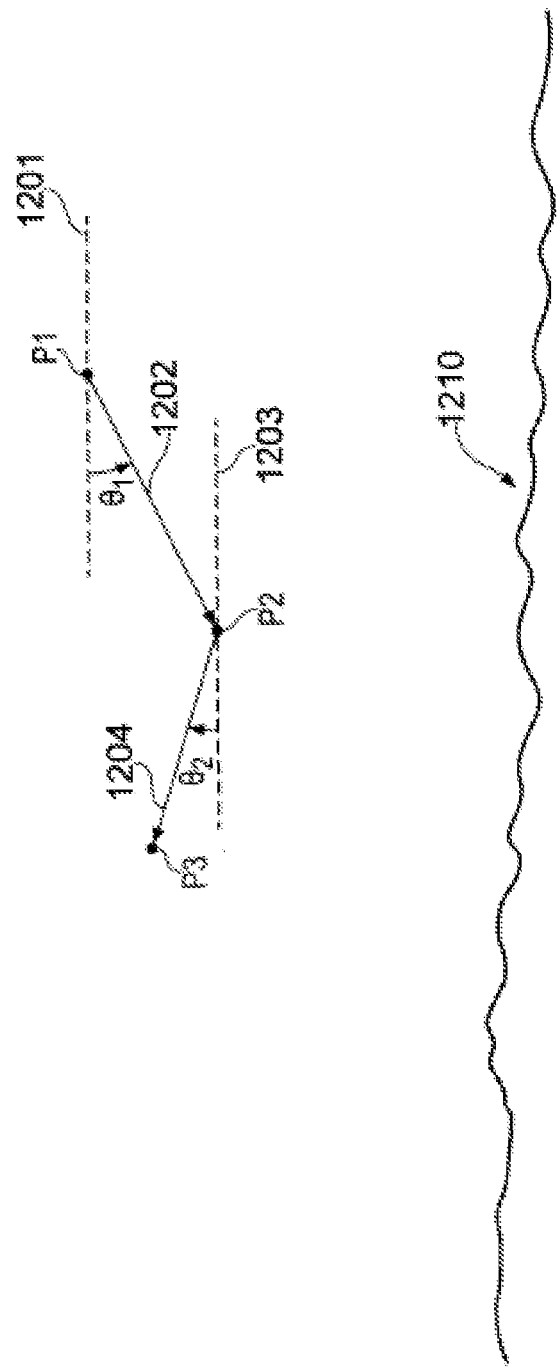
FIG. 28 illustrates a schematic of a flight path of the aircraft illustrated in FIG. 27.

FIG. 28 illustrates a schematic of a flight path of the aeroplane 1200 illustrated in FIG. 27. The reference numeral 1210 indicates terrain or water. The arrow labelled with the reference numeral 1202 is indicative of the pitch of the aeroplane 1200 when the aeroplane 1200 is in a first position P1, relative to a horizontal normal line 1201. It can be seen from FIG. 28 that the aeroplane is descending at an angle $\theta_1$.

The detectors 1006 provide inputs to the control circuitry 1012. After analysing the inputs from the detectors 1006, the control circuitry 1012 determines that there is a danger of collision. The collision may, for example, be a controlled or uncontrolled flight into the terrain/water 1210. The control circuitry 1012 may determine this, for example, if the rate of descent of the aeroplane 1200 exceeds a threshold rate and the altitude of the aeroplane 1200 is below a threshold value.

The control circuitry 1012 responds to the determination by causing the rocket motor(s) 34, 434, 534, 634, 734 to apply an upwards force to the aeroplane 1200 while it is descending. In this example, the application of the upwards force reduces the rate of descent (or causes the aeroplane 1200 to ascend) and alters the pitch of the aeroplane 1200.

The upwards force is applied to the aeroplane 1200 when the aeroplane 1200 is at a second position P2. The arrow labelled with the reference numeral 1204 is indicative of the pitch of the aeroplane 1200, relative to a horizontal normal line 1203, after the upwards force has been applied. It can be seen from FIG. 28 that the aeroplane 1200 is ascending at an angle $\theta_2$.

It can also be seen from FIG. 28 that advantageously, the application of the upwards force prevents a collision between the aeroplane 1200 and the terrain 1210.

Figure 29A:
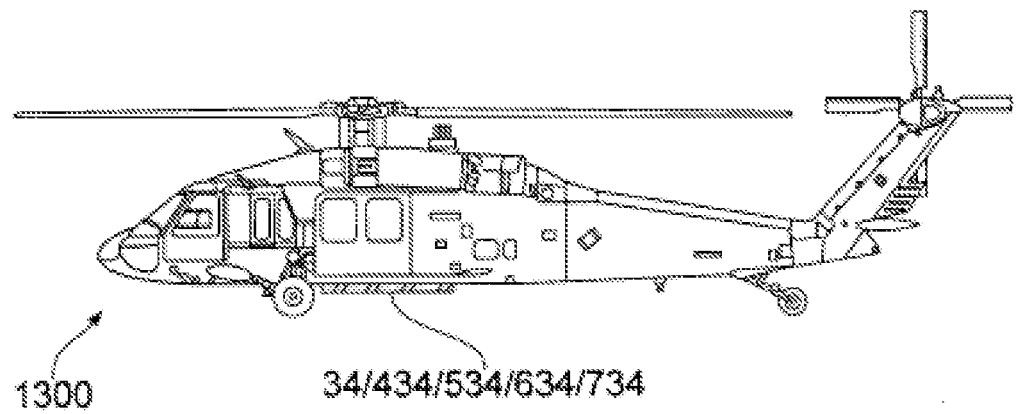
FIG. 29A illustrates a side elevation of a third aircraft, in the form of a helicopter, which comprises at least one rocket motor.
Figure 29B:
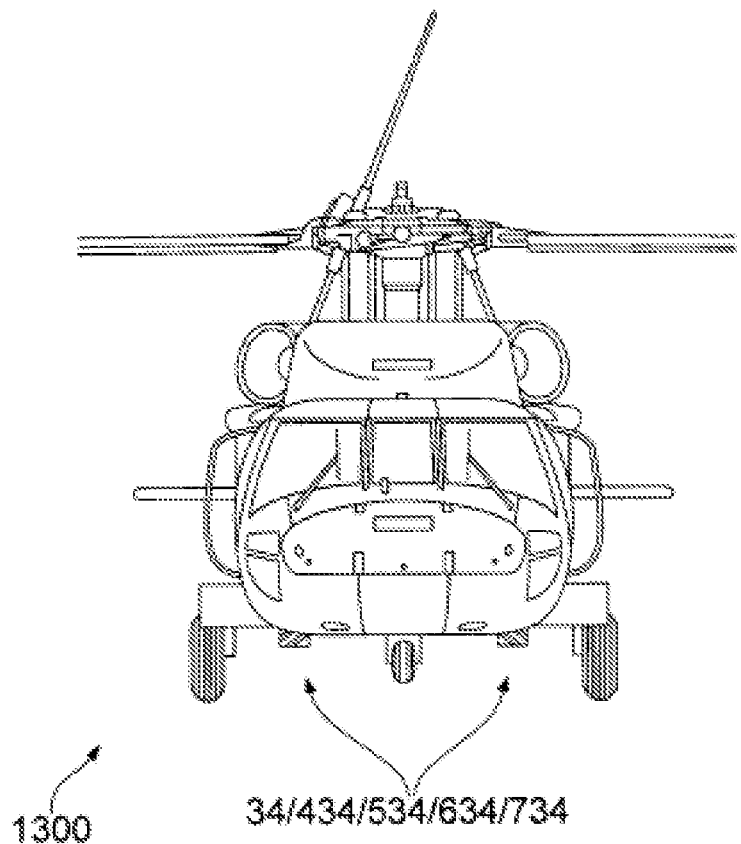
FIG. 29B illustrates a front elevation of the third aircraft.

In the example illustrated in FIGS. 29A and 29B, the aircraft is a helicopter 1300. The helicopter 1300 comprises one or more rocket motors. The rocket motor(s) might, for example, be any of the first, fifth, sixth, seventh or eighth examples 34, 434, 534, 634, 734 described above. The one or more rocket motors are positioned on the underside of the helicopter and are configured to apply an upwards force to the helicopter 1300.

In this example, the detectors 1006 provide inputs to the control circuitry 1012 that indicate that there is a danger of a collision with ground. For example, the input provided by the detectors 1006 may indicate that an engine of the helicopter 1300 has failed (or that part of an engine of the helicopter 1300 has failed) or that the helicopter 1300 has run out of fuel. Alternatively or additionally, the detectors 1006 may provide an input indicating that there is a danger of collision because the rate of descent of the helicopter 1300 exceeds a threshold rate and the altitude of the helicopter 1300 is below a threshold value.

The control circuitry 1012 analyses the inputs provided by the detectors 1012 and determines that there is a danger of collision with ground (for example, because it determines from the inputs that the rate of descent of the helicopter 1300 exceeds a threshold rate and the altitude of the helicopter 1300 is below a threshold value). The control circuitry 1012 responds to the determination by causing the rocket motor(s) 34, 434, 534, 634, 734 to apply an upwards force to the helicopter 1300 while it is descending. In this example, the application of the upwards force reduces the rate of descent of the helicopter 1300 or causes the helicopter 1300 to ascend.

Advantageously, the application of the upwards force to the helicopter 1300 may help the pilot of the aircraft to land the helicopter 1300 and/or reduce the severity of any impact with ground.

IV. Safety Election Pod

Figure 30:
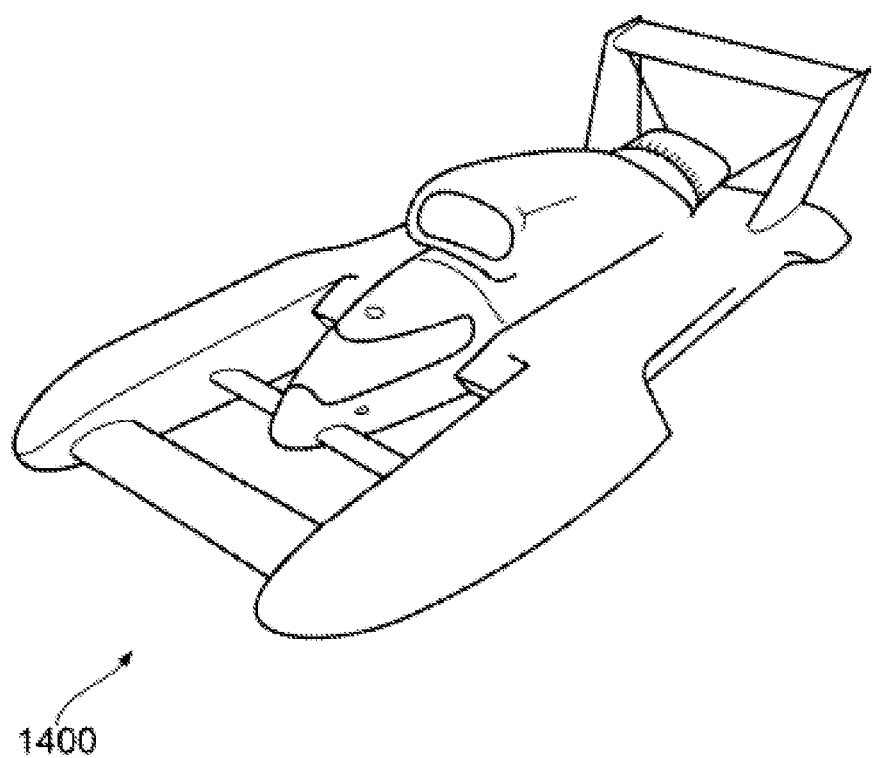
FIG. 30 illustrates a perspective view of a powerboat.

FIG. 30 illustrates a perspective view of a powerboat 1400. The powerboat 1400 may include a safety ejection pod. In this example, the first, fifth, sixth, seventh or eighth examples 34, 434, 534, 634, 734 of the rocket motor are used to apply an upwards force to the ejection seat. The rocket motors 34, 434, 534, 634, 734 could also be used to eject a pod/seat in other types of vehicle, including land-based vehicles and aircraft.

V. Closing Comments

Although embodiments of the present invention have been described in the preceding paragraphs with reference to various examples, it should be appreciated that modifications to the examples given can be made without departing from the scope of the invention as claimed.

As explaned above, the rocket motors 34a, 34b included in the vehicles 2, 202, 302 illustrated in FIGS. 18, 19, 21 and 22 could be any of the linear rocket motors 34, 134, 234, 334, 434, 534, 634, 734, 834 illustrated in FIGS. 1, 2, and 4 to 16. In some examples, the rocket motors 34a, 34b may not be (elongate) linear rocket motors. For example, each rocket motor 34a, 34b could be made up of a series of smaller rocket motors that have a horizontal cross section that is circular or square, such that the length dimension of each of the smaller rocket motors is no greater than its depth or width.

Any of the rocket motors may include a protective hinged cover.

In some implementations, the rocket motors 34a, 34b need not be positioned on (flange portions 33a, 33b of) the belly plate 31 itself. Instead, the rocket motors 34a, 34b may be positioned on a member or members that are separate from, but connected to, the belly plate 31 (thus enabling the force applied by the rocket motors 34a, 34b to be transferred from the member(s) to the belly plate 31).

The linear rocket motors 34, 134, 234, 334, 434, 534, 634, 734, 834 described above may have different applications to that described above. For example, in another implementation one or more of the linear rocket motors 34, 134, 234, 334, 434, 534, 634, 734, 834 may form part of an interceptor missile. For instance, a linear rocket motor 34, 134, 234, 334, 434, 534, 634, 734, 834 may be positioned lengthwise at the rear end or mid-section of the body of an interceptor missile, enabling the linear rocket motor 34, 134, 234, 334, 434, 534, 634, 734, 834 to rapidly change the direction of the missile when desired.

The rocket motors included in the aircraft 1100, 1200, 1300, illustrated in FIGS. 25, 27, 29A and 29B could be any of the linear rocket motors 34, 134, 234, 334, 434, 534, 634, 734, 834, 934 illustrated in FIGS. 1, 2, 4 to 16 and 26. In some examples, the rocket motors included in the aircraft may not be (elongate) linear rocket motors. For example, each rocket motor could be made up of a series of smaller rocket motors that have a horizontal cross section that is circular or square, such that the length dimension of each of the smaller rocket motors is no greater than its depth or width.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Where elements have been defined or described as being "connected" to one another, this should be interpreted to cover i) those elements may directly connected together (with no intervening elements) and ii) those elements being connected together via intervening elements.

Whilst endeavouring in the foregoing specification to draw attention to those features of the invention believed to be of particular importance it should be understood that the applicant claims protection in respect of any patentable feature or combination of features hereinbefore referred to and/or shown in the drawings whether or not particular emphasis has been placed thereon.

I claim:

1. A rocket motor, comprising:
    a casing comprising a wall defining a plurality of gas exit apertures, wherein the casing has a length dimension, a width dimension and a depth dimension, the length dimension being greater than the width dimension and the length dimension being greater than the depth dimension;
    solid propellant, located inside the casing, arranged to generate a force in a direction that is perpendicular to the length dimension of the casing; and
    at least one filter, positioned between the solid propellant and the plurality of gas exit apertures, configured to prevent unburnt solid propellant from being ejected through the plurality of gas exit apertures.

2. The rocket motor as claimed in claim 1, wherein the solid propellant is arranged to cause ejection of gas from the casing in a direction that is aligned with the depth dimension of the casing.

3. The rocket motor as claimed in claim 1, wherein the solid propellant is arranged to cause ejection of gas from the casing in a direction that is perpendicular to the length dimension of the casing.

4. The rocket motor as claimed in claim 1, wherein the length dimension is orthogonal to the width dimension, the length dimension is orthogonal to the depth dimension, and the width dimension is orthogonal to the depth dimension.

5. The rocket motor as claimed in claim 1, wherein the solid propellant is formed as pellets.

6. The rocket motor as claimed in claim 1, wherein the wall defining the plurality of gas exit apertures is an upper wall.

7. The rocket motor as claimed in claim 6, wherein at least some of the plurality of gas exit apertures diverge in a direction of movement of gas ejected from the casing in operation.

8. The rocket motor as claimed in claim 6, wherein the casing comprises a plurality of walls including the upper wall and first and second side walls supporting the upper wall.

9. The rocket motor as claimed in claim 8, wherein the first and second side walls are orthogonal to the upper wall.

10. The rocket motor as claimed in claim 1, wherein the casing defines one or more rocket nozzles.

11. The rocket motor as claimed in claim 1, wherein the casing comprises a plurality of walls forming an elongate chamber which extends along the whole of the length dimension and width dimension.

12. The rocket motor as claimed in claim 1, wherein the length dimension is at least twice as great as the width dimension.

13. The rocket motor as claimed in claim 1, wherein the length dimension is at least five times as great as the width dimension.

14. The rocket motor as claimed in claim 1, wherein the casing comprises a base extending along the whole of the length dimension and at least two side walls extending along the whole of the length dimension, the base and the two side walls being integrally formed in a single part.

15. The rocket motor of claim 1, wherein the at least one filter comprises a plurality of apertures shaped to enable gas to pass through the filter and shaped to prevent unburnt solid propellant from passing through the filter.

16. The rocket motor of claim 1, wherein the at least one filter abuts the wall.

17. The rocket motor of claim 16, wherein the at least one filter comprises a plurality of protrusions which abut the wall.

18. The rocket motor of claim 1, wherein the casing comprises a first end cap and a second end cap and the at least one filter extends from the first end cap to the second end cap, along the length dimension of the casing.

19. The rocket motor of claim 1, further comprising an igniter, positioned inside the casing, configured to ignite the solid propellant, wherein the solid propellant is positioned around the igniter.

20. A rocket motor, comprising:

non-gaseous matter arranged for ejection from the rocket motor;

a first propellant material arranged to eject the non-gaseous matter from the rocket motor to generate a first groundwards force; and a second propellant material arranged, following ejection of the non-gaseous matter from the rocket motor, to cause ejection of gas from the rocket motor to generate a second groundwards force, wherein the second propellant material is arranged to be ignited by the first propellant material.

21. The rocket motor as claimed in claim 20, wherein the first propellant material is located above the second propellant material.

22. The rocket motor as claimed in claim 20, wherein the second propellant material is arranged to be ignited at the same time as the first propellant material.

23. The rocket motor as claimed in claim 20, further comprising a casing containing the non-gaseous matter, the first propellant material and the second propellant material.

24. The rocket motor as claimed in claim 23, wherein the casing comprises a plurality of exit gas apertures via which gas is ejected from the rocket motor by the second propellant material.

25. The rocket motor as claimed in claim 24, wherein at least some of the plurality of gas exit apertures diverge in a direction of movement of gas ejected from the rocket motor.

26. A rocket motor, comprising:

a casing comprising a plurality of elongate side walls at least partially defining a single elongate chamber, wherein the casing has a length dimension, a width dimension and a depth dimension, the length dimension being greater than the width dimension, the width dimension being greater than the depth dimension and the length dimension being greater than the depth dimension; and propellant, located in the single elongate chamber, arranged to generate a force in a direction that is perpendicular to the length dimension of the casing.

27. A rocket motor, comprising:

a casing having a length dimension, a width dimension and a depth dimension, wherein the length dimension is greater than the width dimension and the length dimension is greater than the depth dimension; and solid combustible propellant, located inside the casing, arranged to generate a force in a direction that is perpendicular to the length dimension of the casing.

* * * * *